(12) United States Patent
Date et al.

(10) Patent No.: US 8,762,659 B2
(45) Date of Patent: Jun. 24, 2014

(54) STORAGE APPARATUS AND METHOD, PROGRAM, AND PLAYBACK APPARATUS AND METHOD

(75) Inventors: Osamu Date, Tokyo (JP); Tamaki Kojima, Kanagawa (JP); Yasuki Ogiwara, Kanagawa (JP); Akira Tokuse, Kanagawa (JP)

(73) Assignee: Sony Corporation (JP)

( * ) Notice: Subject to any disclaimer, the term of this patent is extended or adjusted under 35 U.S.C. 154(b) by 1085 days.

(21) Appl. No.: 12/438,983

(22) PCT Filed: Sep. 19, 2007

(86) PCT No.: PCT/JP2007/068116
§ 371 (c)(1),
(2), (4) Date: Sep. 11, 2009

(87) PCT Pub. No.: WO2008/035688
PCT Pub. Date: Mar. 27, 2008

(65) Prior Publication Data
US 2010/0014719 A1      Jan. 21, 2010

(30) Foreign Application Priority Data

Sep. 19, 2006  (JP) ................................ P2006-252239

(51) Int. Cl.
*G06F 12/00*     (2006.01)
(52) U.S. Cl.
USPC .................... 711/156; 711/E12.001; 382/118
(58) Field of Classification Search
USPC .......................................... 711/156; 382/118
See application file for complete search history.

(56) References Cited

U.S. PATENT DOCUMENTS

| | | | |
|---|---|---|---|
| 6,651,076 B1 * | 11/2003 | Asano | 1/1 |
| 2002/0007366 A1 * | 1/2002 | Fontijn | 707/205 |
| 2002/0033844 A1 * | 3/2002 | Levy et al. | 345/744 |
| 2002/0049731 A1 * | 4/2002 | Kotani | 707/1 |
| 2006/0170791 A1 | 8/2006 | Porter et al. | |
| 2008/0027931 A1 * | 1/2008 | Lu et al. | 707/6 |

FOREIGN PATENT DOCUMENTS

| | | |
|---|---|---|
| JP | 2000-339207 | 12/2000 |
| JP | 2004-336466 | 11/2004 |
| JP | 2005-101905 | 4/2005 |

(Continued)

OTHER PUBLICATIONS

International Search Report dated Jan. 8, 2008.

(Continued)

*Primary Examiner* — Larry Mackall
(74) *Attorney, Agent, or Firm* — Sheridan Ross P.C.

(57) ABSTRACT

A storage apparatus and method, a program, and a playback apparatus and method, capable of quickly reading a specific part of data among metadata including metadata associated with faces. A storage controller controls storing face metadata in a storage medium, wherein the face metadata includes a content data set added for each content, content data storage location information indicating the storage location of the content data set, a detected face data set associated with each of face images detected from a content, and detected face data storage location information indicating the storage location of the detected face data set, and wherein the face metadata is configured such that the content data storage location information and face block storage location information indicating the storage location of the detected face data storage location information are described in a single data set. The present invention is applicable to a digital camera.

25 Claims, 13 Drawing Sheets

(56) References Cited

FOREIGN PATENT DOCUMENTS

| | | |
|---|---|---|
| JP | 2005-101906 | 4/2005 |
| JP | 2005-333381 | 12/2005 |
| JP | 2006-134006 | 5/2006 |
| JP | 2006-508601 | 9/2006 |
| JP | 2007-041987 | 2/2007 |

OTHER PUBLICATIONS

Japanese Patent Office Action dated Oct. 26, 2010 corresponding to Japanese Serial No. 2006-252239.

* cited by examiner

FIG. 5

| Tag | Type | Count | Content |
|---|---|---|---|
| UNIQUELY ASSIGNED NUMBER | UNDEFINED | NUMERAL VALUE CORRESPONDING TO SIZE OF POINTED DATA | OFFSET TO STORAGE LOCATION AT WHICH POINTED DATA IS STORED |

FIG. 6

| Tag | Type | Count | Content |
|---|---|---|---|
| UNIQUELY ASSIGNED NUMBER | DATA | NUMERAL VALUE CORRESPONDING TO THE NUMBER OF METADATA | METADATA |

FIG. 14
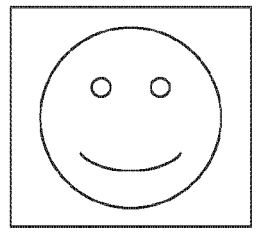 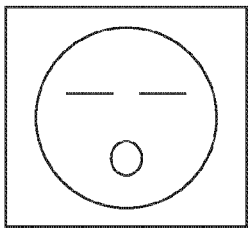 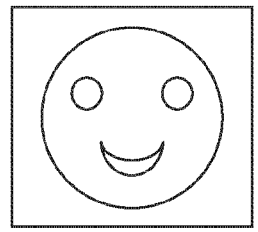
MR. A          MR. K          MR. O
FILE 060111.JPG INCLUDES DATA OF THREE PERSONS
FIG. 15
060111.MP4
MR. A        
MR. K         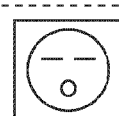
MR. O        

STORAGE APPARATUS AND METHOD, PROGRAM, AND PLAYBACK APPARATUS AND METHOD

TECHNICAL FIELD

The present invention relates to a storage apparatus and method, a program, and a playback apparatus and method, and more particularly, to a storage apparatus and method, a program, and a playback apparatus and method capable of storing or playing back metadata.

BACKGROUND ART

An increase in operating speed of a CPU (Central Processing Unit) achieved in recent years has made it possible to perform a complicated process such as a detection of a face of a person from an image in a short time. Furthermore, it has also become possible to perform a recognition process to identify a person from a detected human face within a short time that is acceptable by users as a waiting time.

In view of the above, an application has been proposed in which a position of a detected human face or a name of a person is stored as metadata for use by the application (see, for example, Patent Document 1).

Patent Document 1: Japanese Unexamined Patent Application Publication No. 2004-336466

DISCLOSURE OF INVENTION

Technical Problem

In the technique disclosed in Patent Document 1, metadata such as the position of a detected human face or the name of a person is stored in an XML format such that the metadata is related to the detected image.

However, in the metadata storage technique disclosed in Patent Document 1, whole metadata is stored in the form of a single structure in a storage area as shown in FIG. 8 of Patent Document 1. Therefore, to obtain actually necessary data included in stored metadata, it is needed to analyze tags one by one to extract target data. Thus, it takes a long time to read necessary data.

Another specific problem in storing metadata associated with a face is that the number of human faces detected from one content is variable, and thus the data size of stored metadata of faces varies from one content to another. Thus, to read actually necessary data, it is necessary to read data until </METADATA> is detected after <METADATA> is detected. This takes a long time, and thus it is difficult to quickly access metadata of a face.

In view of the above, the present invention provides a technique of a technique of more quickly reading necessary metadata of metadata including metadata associated with a face.

Technical Solution

A storage apparatus according to a first aspect of the present invention includes storage control means for controlling storing data in a storage medium, the data including first metadata added for each content, first storage location information indicating a location at which the first metadata is stored in the storage medium, second metadata associated with each face image and added for each face image detected from the content, and second storage location information indicating a location at which the second metadata is stored in the storage medium, the data being configured such that the first storage location information and third storage location information indicating a location at which the second storage location information is stored in the storage medium are described in a single data set.

The storage control means may control storing the data in the storage medium, the data being configured such that the first metadata includes information indicating the version of face detection means which has detected the face image from the content.

The storage control means may control storing the data in the storage medium, the data being configured such that the second metadata includes information indicating the location of the face image in the content and information indicating the size of the face image.

The storage control means may control storing the data in the storage medium such that a set of the first metadata, a set of the first storage location information, a set of each second metadata, and a set of a plurality of pieces of second storage location information are stored in the storage medium such that each set is stored in a continuous storage area of the storage medium.

The storage control means may control storing the data in the storage medium, the data being configured such that a set of the first storage location information includes information indicating the number of face images for each of which second metadata is added.

The storage control means may control storing the data in the storage medium, the data being configured such that the set of first storage location information includes information indicating the number of face images which are selected, in accordance with a predetermined rule, from face images detected from the content and for each of which second metadata is added.

The storage control means may control storing the data in the storage medium, the data further including face image data of each face image detected from the content and fourth storage location information indicating a location at which each face image data is stored in the storage medium, the data being configured such that the set of first storage location information includes fifth storage location information indicating a location at which the fourth storage location information is stored in the storage medium.

The storage control means may control storing the data in the storage medium such that a set of a plurality of pieces of fourth storage location information is stored in a continuous storage area of the storage medium.

The storage control means may control storing the data in the storage medium, the data being configured such that the set of first storage location information includes information indicating the number of face image data.

The storage control means may control storing the data in the storage medium, the data further including third metadata associated with a person whose face image has been detected from the content, and fourth storage location information indicating a location at which the third metadata is stored in the storage medium, the data being configured such that the set of first storage location information includes fifth storage location information indicating a location at which the fourth storage location information is stored in the storage medium.

The storage control means may control storing the data in the storage medium such that a set of a plurality of pieces of fourth storage location information is stored in a continuous storage area of the storage medium.

The storage control means may control storing the data in the storage medium, the data being configured such that the set of first storage location information includes information indicating the number of third metadata.

A storage method according to the first aspect of the present invention includes the step of controlling storing data in a storage medium, the data including first metadata added for each content, first storage location information indicating a location at which the first metadata is stored in the storage medium, second metadata associated with each face image and added for each face image detected from the content, and second storage location information indicating a location at which the second metadata is stored in the storage medium, the data being configured such that the first storage location information and third storage location information indicating a location at which the second storage location information is stored in the storage medium are described in a single data set.

A program according to the first aspect of the present invention causes a computer to execute a step of controlling recording data in a storage medium, the data including first metadata added for each content, first storage location information indicating a location at which the first metadata is stored in the storage medium, second metadata associated with each face image and added for each face image detected from the content, and second storage location information indicating a location at which the second metadata is stored in the storage medium, the data being configured such that the first storage location information and third storage location information indicating a location at which the second storage location information is stored in the storage medium are described in a single data set.

A playback apparatus according to a second aspect of the present invention includes read control means for controlling reading data stored in a storage medium, the data including first metadata added for each content, first storage location information indicating a location at which the first metadata is stored in the storage medium, second metadata associated with each face image and added for each face image detected from the content, and second storage location information indicating a location at which the second metadata is stored in the storage medium, the data being configured such that the first storage location information and third storage location information indicating a location at which the second storage location information is stored in the storage medium are described in a single data set.

The read control means may control reading the data, the data being stored in the storage medium such that a set of the first metadata, a set of the first storage location information, a set of each second metadata, and a set of a plurality of pieces of second storage location information are stored such that each set is stored in a continuous storage area of the storage medium.

The read control means may control reading the data, the data being configured such that a set of the first storage location information includes information indicating the number of face images for each of which second metadata is added.

The read control means may control reading the data, the data further including face image data of each face image detected from the content and fourth storage location information indicating a location at which each face image data is stored in the storage medium, the data being configured such that the set of first storage location information includes fifth storage location information indicating a location at which the fourth storage location information is stored in the storage medium.

The read control means may control reading the data, the data being stored such that a set of a plurality of pieces of fourth storage location information is stored in a continuous storage area of the storage medium.

The read control means may control reading the data, the data being configured such that the set of first storage location information includes information indicating the number of face image data.

The read control means may control reading the data, the data further including third metadata associated with a person whose face image has been detected from the content, and fourth storage location information indicating a location at which the third metadata is stored in the storage medium, the data being configured such that the set of first storage location information includes fifth storage location information indicating a location at which the fourth storage location information is stored in the storage medium.

The read control means may control reading the data, the data being stored such that a set of a plurality of pieces of fourth storage location information is stored in a continuous storage area of the storage medium.

The read control means may control reading the data, the data being configured such that the set of first storage location information includes information indicating the number of third metadata.

A playback method according to the second aspect of the present invention includes the step of controlling reading data stored in a storage medium, the data including first metadata added for each content, first storage location information indicating a location at which the first metadata is stored in the storage medium, second metadata associated with each face image and added for each face image detected from the content, and second storage location information indicating a location at which the second metadata is stored in the storage medium, the data being configured such that the first storage location information and third storage location information indicating a location at which the second storage location information is stored in the storage medium are described in a single data set.

A program according to the second aspect of the present invention causes a computer to execute a step of controlling reading data stored in a storage medium, the data including first metadata added for each content, first storage location information indicating a location at which the first metadata is stored in the storage medium, second metadata associated with each face image and added for each face image detected from the content, and second storage location information indicating a location at which the second metadata is stored in the storage medium, the data being configured such that the first storage location information and third storage location information indicating a location at which the second storage location information is stored in the storage medium are described in a single data set.

In the first aspect, the present invention provides the technique of controlling storing data in a storage medium, wherein the data includes first metadata added for each content, first storage location information indicating a location at which the first metadata is stored in the storage medium, second metadata associated with each face image and added for each face image detected from the content, and second storage location information indicating a location at which the second metadata is stored in the storage medium, and wherein the data is configured such that the first storage location information and third storage location information indicating a location at which the second storage location information is stored in the storage medium are described in a single data set.

In the second aspect, the present invention provides the technique of controlling reading data stored in a storage medium, wherein the data includes first metadata added for each content, first storage location information indicating a location at which the first metadata is stored in the storage medium, second metadata associated with each face image and added for each face image detected from the content, and second storage location information indicating a location at which the second metadata is stored in the storage medium, and wherein the data is configured such that the first storage location information and third storage location information indicating a location at which the second storage location information is stored in the storage medium are described in a single data set.

Advantageous Effects

In the first aspect of the present invention, as described above, it is possible to read metadata in a playback operation.

More specifically, in the first aspect of the present invention, in a playback operation, it is possible to more quickly read necessary metadata among metadata including metadata associated with faces.

In the second aspect of the present invention, it is possible to read metadata.

More specifically, in the second aspect of the present invention, it possible to more quickly read necessary metadata among metadata including metadata associated with faces.

BRIEF DESCRIPTION OF DRAWINGS

FIG. 5 is a diagram illustrating a format of storage location information in face metadata.

FIG. 6 is a diagram illustrating a format of actual data in face metadata.

FIG. 14 is a diagram illustrating an example of a screen displayed using face metadata.

FIG. 15 is a diagram illustrating an example of a screen displayed using face metadata.

Figure 1:
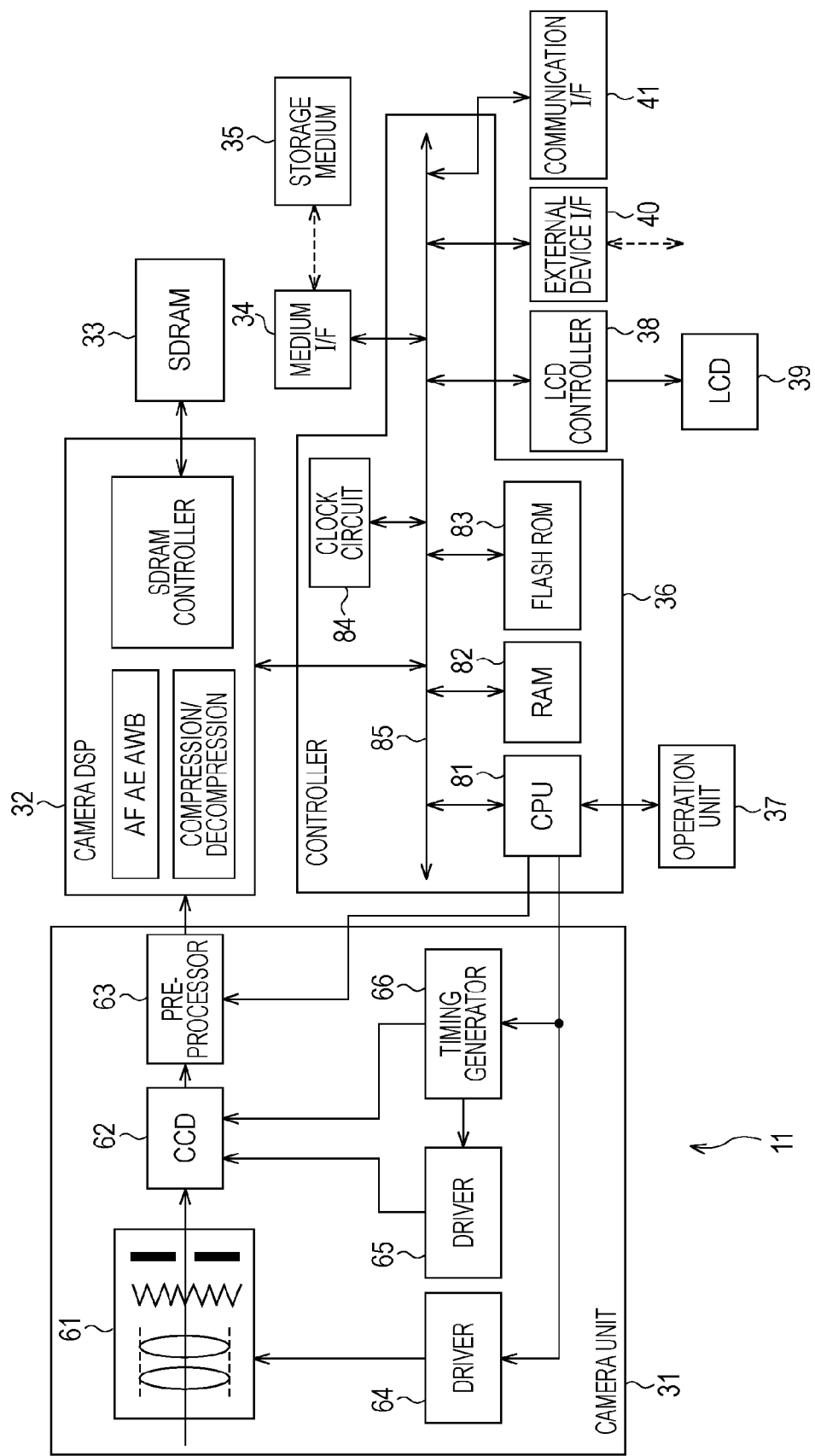
FIG. 1 is a block diagram illustrating a configuration of a digital camera according to an embodiment of the present invention.

EXPLANATION OF REFERENCE NUMERALS 35 storage medium, 36 controller, 81 CPU, 82 RAM, 83 flash ROM, 101 controller, 121 face detection engine, 122 face recognition engine, 123 storage controller, 124 playback controller, 131 face metadata, 141 block item set generator, 142 content data set generator, 143 face block set generator, 144 detected face data set generator, 145 image data block set generator, 146 detected face image data set generator, 147 personal data block set generator, 148 person-of-detected-face data set generator, 151 block item set reader, 152 content data set reader, 153 face block set reader, 154 detected face data set reader, 155 image data block set reader, 156 detected face image data set reader, 157 personal data block set reader, 158 person-of-detected-face data set reader, 201 CPU, 202 ROM, 203 RAM, 208 storage unit, 211 removable medium

BEST MODES FOR CARRYING OUT THE INVENTION

FIG. 1 is a block diagram illustrating a configuration of a digital camera 11 according to an embodiment of the present invention.

The digital camera 11 includes a camera unit 31, a camera DSP (Digital Signal Processor) 32, an SDRAM (Synchronous Dynamic Random Access Memory) 33, a medium interface (hereinafter referred to as a medium I/F) 34, a storage medium 35, a controller 36, an operation unit 37, an LCD controller 38, an LCD 39, an external device interface (hereinafter referred to as an external device I/F) 40, and a communication interface (hereinafter referred to as a communication I/F) 41.

The storage medium 35 is a removable medium used to store data or a program. Specific examples of media usable as the storage medium 35 include a so-called memory card using a semiconductor memory, an optical storage medium such as a recordable DVD (Digital Versatile Disc) or a recordable CD (Compact Disc), and a magnetic disk. In the present embodiment, by way of example, it is assumed that a memory card using a semiconductor memory or a hard disk drive is used as the storage medium 35.

The camera unit 31 includes an optical block 61, a CCD (Charge Coupled Device) 62, a preprocessor 63, an optical block driver 64, a CCD driver 65, and a timing generator 66. The optical block 61 includes a lens, a focusing mechanism, a shutter mechanism, and an iris mechanism.

The controller 36 includes a CPU (Central Processing Unit) 81, a RAM (Random Access Memory) 82, a flash ROM (Read Only Memory) 83, and a clock circuit 84, wherein these parts are connected to each other via a system bus 85. The controller 36 may be realized using, for example, a general-purpose built-in microcomputer or a dedicated system LSI (Large Scale Integrated circuit). The controller 36 controls various parts of the digital camera 11.

The RAM 82 is mainly used as a work area for temporarily storing an intermediate result during a process. The flash ROM 83 stores various programs executed by the CPU 81 and also stores data necessary in execution of programs. The clock circuit 84 is capable of providing data indicating the current year, month, day, the day of week, and time, and is also capable of providing data indicating a photographing date/time.

In the process of taking an image, under the control of the controller 36, the optical block driver 64 produces a driving signal for driving the optical block 61 and supplies the produced driving signal to the optical block 61 thereby to drive the optical block 61. In accordance with the driving signal supplied from the optical block driver 64, the focusing mechanism, the shutter mechanism, and the iris mechanism of the optical block 61 are controlled, and the optical block 61 captures an optical image of a subject and forms the optical image on the CCD 62.

The CCD 62 converts the optical image formed by the optical block 61 into an electrical image signal and outputs the resultant electrical image signal. More specifically, the CCD 62 operates in accordance with the driving signal supplied from the CCD driver 65 so as to capture the optical image of a subject formed by the optical block 61, and the CCD 62 supplies the electrical image signal corresponding to the captured optical image of the subject (image information) to the preprocessor 63 in accordance with the timing signal supplied from the timing generator 66 under the control of the controller 36.

Instead of the CCD 62, other types of photoelectric conversion devices such as a CMOS (Complementary Metal-Oxide Semiconductor) sensor may be used.

As described above, under the control of the controller 36, the timing generator 66 generates the timing signal for providing particular timing. The CCD driver 65 generates the driving signal to be supplied to the CCD 62 in accordance with the timing signal supplied from the timing generator 66.

The preprocessor 63 performs a CDS (Correlated Double Sampling) process on the electrical image signal supplied from the CCD 62 to achieve a high S/N ratio, performs an AGC (Automatic Gain Control) process to control the gain, and performs an A/D (Analog/Digital) conversion process to produce image data in the form of a digital signal.

The image data converted into the form of the digital signal by the preprocessor 63 is supplied to the camera DSP 32. The camera DSP 32 performs a camera signal process such as an AF (Auto Focus) process, an AE (Auto Exposure) process, and an AWB (Auto White Balance) process on the supplied image data. After being subjected to various adjustments described above, the image data is encoded into a predetermined format such as a JPEG (Joint Photographic Experts Group) format or a JPEG2000 format. The resultant encoded image data is supplied to the storage medium 35 mounted on the digital camera 11 via the system bus 85 and the medium I/F 34, and is stored in the form of a file in the storage medium 35. A motion image file may be produced by encoding a set of image data using a motion image encoding scheme such as an MPEG (Motion Picture Experts Group) scheme, and the resultant motion image file may be stored in the storage medium 35.

Note that a still image or a motion image is an example of a content, and a file in which a still image or a motion image is stored is an example of a content file.

In accordance with an inputting operation performed by a user and accepted via the operation unit 37 including a touch panel, a control key, etc., desired image data stored in the storage medium 35 is read from the storage medium 35 via the medium I/F 34 and supplied to the camera DSP 32.

If the camera DSP 32 receives the encoded image data read from the storage medium 35 and supplied via the medium I/F 34, the camera DSP 32 decodes the received encoded image data, and supplies the resultant decoded image data to the LCD controller 38 via the system bus 85. From the supplied image data, the LCD controller 38 produces an image signal to be supplied to the LCD 39, and supplies the produced image signal to the LCD 39. Thus, an image corresponding to the image data stored in the storage medium 35 is displayed on the display screen of the LCD 39.

In the present embodiment, the digital camera 11 has an external device I/F 40. Via this external device I/F 40, the digital camera 11 is allowed to be connected to an external device such as a personal computer. This allows the digital camera 11 to receive image data from the personal computer and store the received image data in the storage medium 35 mounted on the digital camera 11, or conversely, supply image data stored in the storage medium 35 mounted on the digital camera 11 to an external device such as a personal computer.

The communication I/F 41 is realized, for example, by a so-called network interface card (NIC) and is connected to a network to acquire various image data or other information via the network.

Furthermore, in the digital camera 11 according to the present embodiment, information such as image data stored in a storage medium after being acquired from an external personal computer or from other external devices via a network may also be read, played back, and displayed on the LCD 39 thereby allowing a user to use the information.

The communication I/F 41 may be a wire interface according to a particular standard such as the IEEE (Institute of Electrical and Electronic Engineers) 1394 standard or the USB (Universal Serial Bus) standard, or the communication I/F 41 may be a wireless interface using light or a radio wave according to a particular standard such as the IEEE802.11a standard, the IEEE802.11b standard, the IEEE802.11g standard, or the Bluetooth standard. That is, the communication I/F 41 may be either a wire or wireless interface.

Figure 2:
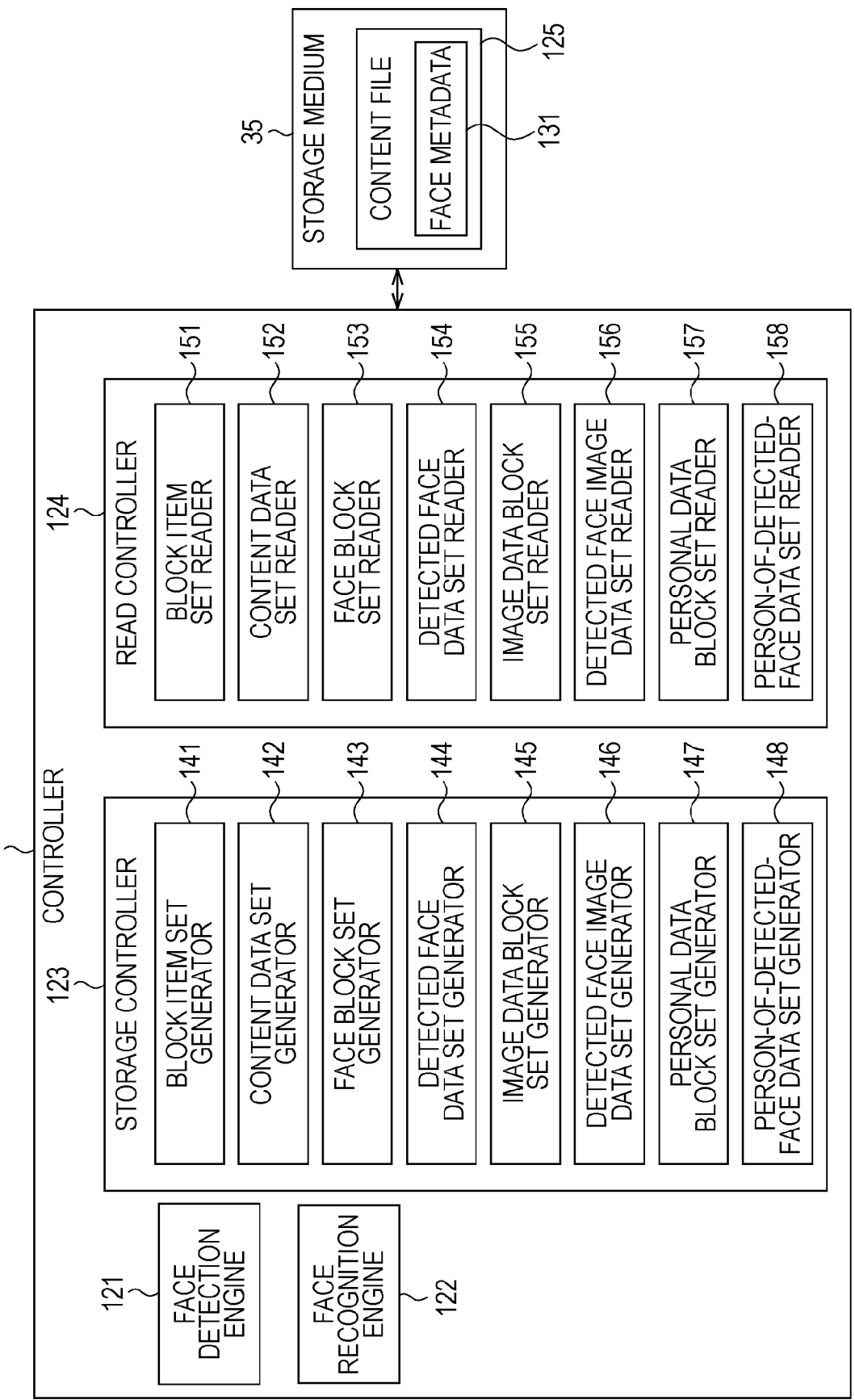
FIG. 2 is a block diagram illustrating functions realized by a CPU by executing a program.

FIG. 2 is a block diagram illustrating functions realized by the CPU 81 by executing a program. By executing the program by the CPU 81, the controller 101 for controlling the whole digital camera 11 is realized.

The controller 101 includes a face detection engine 121, a face recognition engine 122, a storage controller 123, and a playback controller 124.

In the storage medium 35, data of a content such as a still image or a motion image is stored as a content file 125.

The face detection engine 121 detects an image of a face (hereinafter referred to as a face image) from a content. For example, on the basis of the data of the content stored in the content file 125, the face detection engine 121 detects pixels with hues within a predetermined range in which hues can be regarded as being of a skin color, from a still image content or a frame of a motion image content, and detects an image area with a size greater than a predetermined threshold from areas including detected pixels. Furthermore, the face detection engine 121 determines whether the detected image is of a face by determining whether the detected image includes an image of eyes and an image of a mouth, thereby detecting a face image. Furthermore, the face detection engine 121 detects the expression of the face image on the basis the shape or the angle of the image of eyes and the image of the mouth used to detect the face, and the face detection engine 121 classifies the expression of the face image. More specifically, for example, the face detection engine 121 determines the degree of similarity to a smiling face.

The method of detecting a face image is not limited to that described above, but any other method may be employed in the present invention without limitation.

The face recognition engine 122 recognizes the face image detected from the content to identify the person of the detected face image. More specifically, the face recognition engine 122 compares the detected face image with registered image, and more particularly, registered face images of respective registered persons. If the face image is identical to a registered face image, the face recognition engine 122 determines that the person of the face image of interest detected from the content is the registered person whose registered face image was determined to be identical to the face image of interest.

Note that the method of recognizing the face image is not limited to that described above, but any other method may be employed. That is, in the present invention, there is no particular restriction on the method of recognizing the face image.

Metadata associated with each registered person is stored in advance, for example, in the flash ROM 83 or the storage medium 35.

The storage controller 123 controls storing the face metadata 131 in the storage medium 35 wherein the face metadata 131 includes metadata associated with a content including a detected face image, metadata associated with the face image detected from a content, and metadata associated with a person corresponding to the detected face image. The face metadata 131 is stored in the storage medium 35 such that the face metadata 131 is included in the content file 125.

Information or data of the face metadata 131 forms a set, as described in further detail later.

The playback controller 124 controls reading the face metadata 131 stored in the storage medium 35.

The storage controller 123 includes a block item set generator 141, a content data set generator 142, a face block set generator 143, a detected face data set generator 144, an image data block set generator 145, a detected face image data set generator 146, a personal data block set generator 147, and a person-of-detected-face data set generator 148.

The block item set generator 141 produces a block item set which is one of information/data sets included in the face metadata 131 and which includes storage location information indicating a storage location at which metadata added for each content is stored in the storage medium 35.

Hereinafter, information indicating a location at which particular data or information is stored or is to be stored in the storage medium 35 will be referred to as storage location information.

The block item set includes storage location information indicating a location at which metadata added for each content is stored in the storage medium 35, storage location information indicating a location at which a face block set is stored in the storage medium 35, storage location information indicating a location at which an image data block set is stored in the storage medium 35, and storage location information indicating a location at which a personal data block set is stored in the storage medium 35.

The face block set is a set of storage location information each indicating a location at which metadata associated with a face image is stored in the storage medium 35. The image data block set is a set of storage location information each indicating a location at which face image data, i.e., data of a face image detected from a content is stored in the storage medium 35. The personal data block set is a set of storage location information each indicating a location at which metadata of a person of a face image detected from a content is stored in the storage medium 35.

The content data set generator 142 generates a content data set, which is one of information/data sets included in the face metadata 131 and which is a set of metadata added for each content.

The face block set generator 143 generates a face block set which is one of information/data sets included in the face metadata 131.

The detected face data set generator 144 generates a detected face data set, which is one of information/data sets included in the face metadata 131 and which is a set of metadata associated with a face image.

The image data block set generator 145 generates an image data block set which is one of information/data sets included in the face metadata 131.

The detected face image data set generator 146 generates a detected face image data set, which is one of information/data sets included in the face metadata 131 and which is a set of face image data of a face image detected from a content.

The personal data block set generator 147 generates a personal data block set which is one of information/data sets included in the face metadata 131.

The person-of-detected-face data set generator 148 generates a person-of-detected-face data set, which is one of information/data included in the face metadata 131 and which is a set of metadata of persons of face images detected from a content.

That is, the storage controller 123 controls storing the face metadata 131 in the storage medium 35 wherein the face metadata 131 includes the block item set, the content data set, the face block set, the detected face data set, the image data block set, the detected face image data set, the personal data block set, and the person-of-detected-face data set.

The playback controller 124 includes a block item set reader 151, a content data set reader 152, a face block set reader 153, a detected face data set reader 154, an image data block set reader 155, a detected face image data set reader 156, a personal data block set reader 157, and a person-of-detected-face data set reader 158.

The block item set reader 151 reads the block item set, which is one of information/data sets included in the face metadata 131, from the storage medium 35.

The content data set reader 152 reads the content data set, which is one of information/data sets included in the face metadata 131, from the storage medium 35 in accordance with the storage location information which is one of elements of the block item set and which indicates the location at which the content data set is stored in the storage medium 35.

The face block set reader 153 reads the face block set, which is one of information/data sets included in the face metadata 131, from the storage medium 35 in accordance with the storage location information which is one of elements of the block item set and which indicates the location at which the face block set is stored in the storage medium 35.

The detected face data set reader 154 reads the detected face data set, which is one of information/data sets included in the face metadata 131, from the storage medium 35 in accordance with the storage location information which is one of elements of the face block set and which indicates the location at which the detected face data set is stored in the storage medium 35.

The image data block set reader 155 reads the image data block set, which is one of information/data sets included in the face metadata 131, from the storage medium 35 in accordance with the storage location information which is one of elements of the block item set and which indicates the location at which the image data block set is stored in the storage medium 35.

The detected face image data set reader 156 reads the detected face image data set, which is one of information/data sets included in the face metadata 131, from the storage medium 35 in accordance with the storage location information which is one of elements of the image data block set and which indicates the location at which the detected face image data set is stored in the storage medium 35.

The personal data block set reader 157 reads the personal data block set, which is one of information/data sets included in the face metadata 131, from the storage medium 35 in accordance with the storage location information which is one of elements of the block item set and which indicates the location at which the personal data block set is stored in the storage medium 35.

The person-of-detected-face data set reader 158 reads the person-of-detected-face data set, which is one of information/data sets included in the face metadata 131, from the storage medium 35 in accordance with the storage location information which is one of elements of the personal data block set and which indicates the location at which the person-of-detected-face data set is stored in the storage medium 35.

As described above, the playback controller 124 controls the reading of the face metadata 131 stored in the storage medium 35 so as to individually read the block item set, the content data set, the face block set, the detected face data set, the image data block set, the detected face image data set, the personal data block set, and the person-of-detected-face data set.

Next, the format of face metadata 131 is described.

Figure 3:
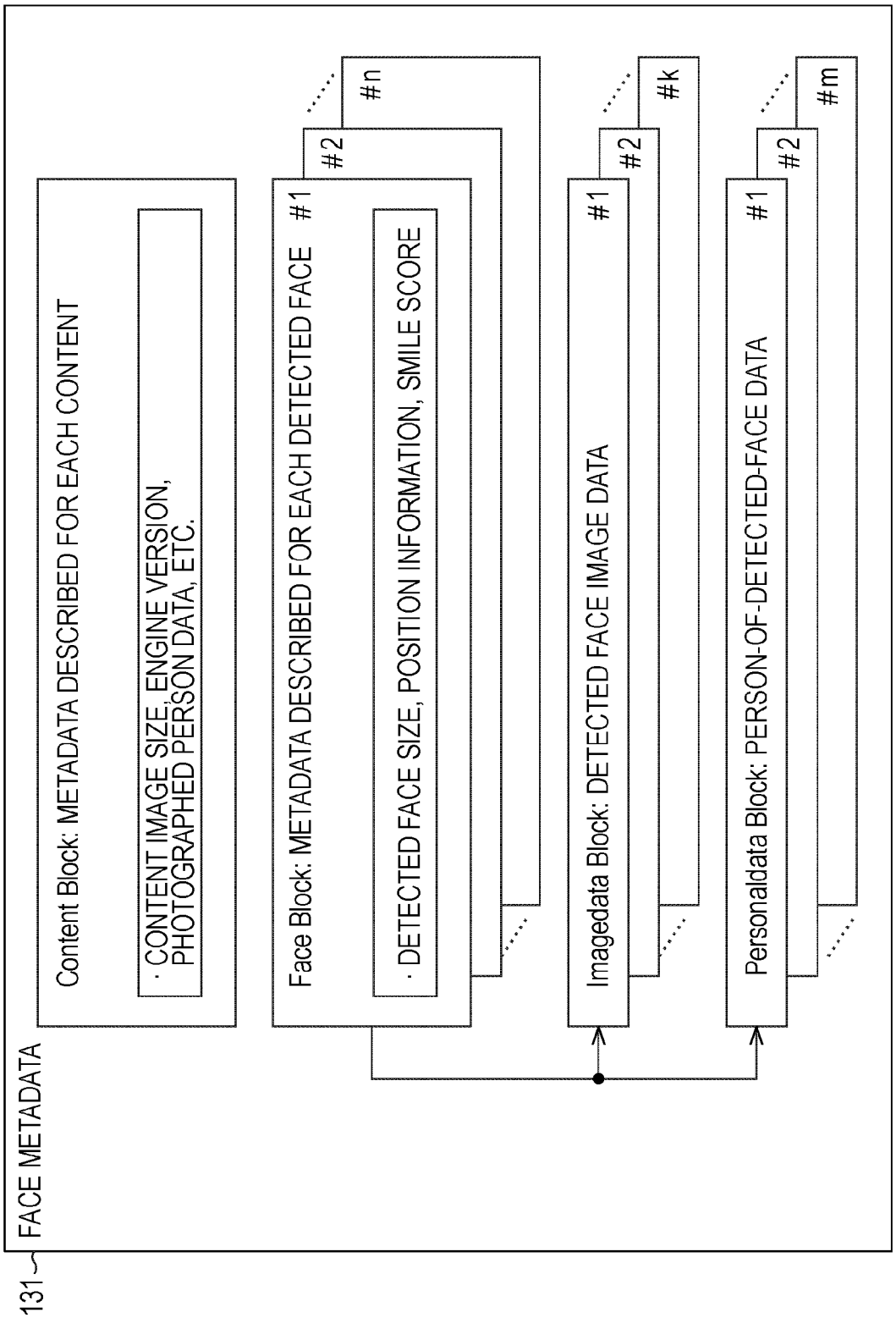
FIG. 3 is a diagram provided for a brief explanation of a format of face metadata.

FIG. 3 is a diagram illustrating, in a simplified manner, the format of the face metadata 131. The face metadata 131 includes four main blocks. More specifically, the face metadata 131 includes a content block including metadata added for each content such as a still image content or a motion image content, a face block including metadata added for each detected face (face image), an image data block including face image data of detected faces (face images), and a personal data block including metadata associated with persons of respective detected faces.

The metadata described in the content block for each content includes, for example, data indicating the size of an image of a content (the size of the image as displayed), data indicating the version of the face detection engine 121, and data indicating the number of persons included in a content image (the number of face images included in the content image).

The metadata described in the face block for each face (face image) includes, for example, data indicating the size of a detected face (the size of a face image), data indicating the location of the detected face, data indicating the smile score representing the similarity of the detected face to a smiling face, and, when the content is a motion image, data indicating a time period during which the face continuously appears.

The metadata in the face block and the face image data in the image data block are related to each other by an ID, i.e., an identifier which is locally defined in the content. An ID for relating the above-described two types of data is necessary because face image data is not necessarily produced and stored for each detected face image. That is, use of IDs in the above-described manner makes it possible to also handle an application in which, when producing face image data needs a large processing load, face image data is produced for only three faces with highest smile scores in the simile scores sorted in the descending order.

Note that an ID locally defined in a content refers to an ID which is unique only in this content, but there can be face image data assigned the same ID in different contents.

In the personal data block, data of a person whose face image was detected is personal data such as data indicating the name, the age, the sex, the birthday, etc. of the person whose face image was detected.

Metadata in the face block and data associated with a person of a detected face image in the personal data block is related by an ID locally defined in a content. The reason why an ID is used to relate the above-described two types of data is described below. In a case where a content of interest is a motion image, a face image of a person A may appear in the motion image in a particular period. The face image of the person A may disappear at the end of this period, and may again appear in the motion image in a later period. In such a case, the face detection engine 121 detects two face images of the same person A, and metadata of the two respective face images are stored in the face block.

In this case, the two face images corresponding to the two stored metadata are of the same person, and thus only one personal data for these two face images is needed to be stored in the personal data block. Thus, in this case, an ID is used to relate a single personal data to the two metadata in the face block. This prevents data from being stored in a duplicated manner, and thus it is possible to reduce the total data size of stored data.

If relating data using IDs is not performed, it is needed that as many face image data and personal data as there are metadata in the face block should be stored respectively in the image data block and the personal data block, and these data should be related by the storage order. However, for example, in the case where a content of interest is a motion image, there is a possibility that duplicated personal data blocks are created, which leads to a disadvantage that a greater storage capacity is needed. Use of IDs to relate data makes it possible to avoid the above problem.

As described above, if a particular number of face images are detected from a content, then for n face images of these detected face images, n face blocks are allocated in the face metadata 131. The selecting of n face images may be performed according to a predetermined rule. For example, top n face images ranked by the size or the smile score may be selected from the detected face images. This makes it possible to prevent a reduction in a usable storage capacity and a reduction in the processing speed, which would occur if the face metadata 131 is stored for all detected face images. For k face images of the n face images for which face blocks are allocated, k image data blocks are allocated in the face metadata 131. Because image data blocks are allocated in the above described manner, k is equal to or smaller than n. For m persons of persons corresponding to the n respective face images for which face blocks are allocated, m personal data blocks are allocated in the face metadata 131. Because personal data blocks are allocated in the above described manner, m is equal to or smaller than n.

Figure 4:
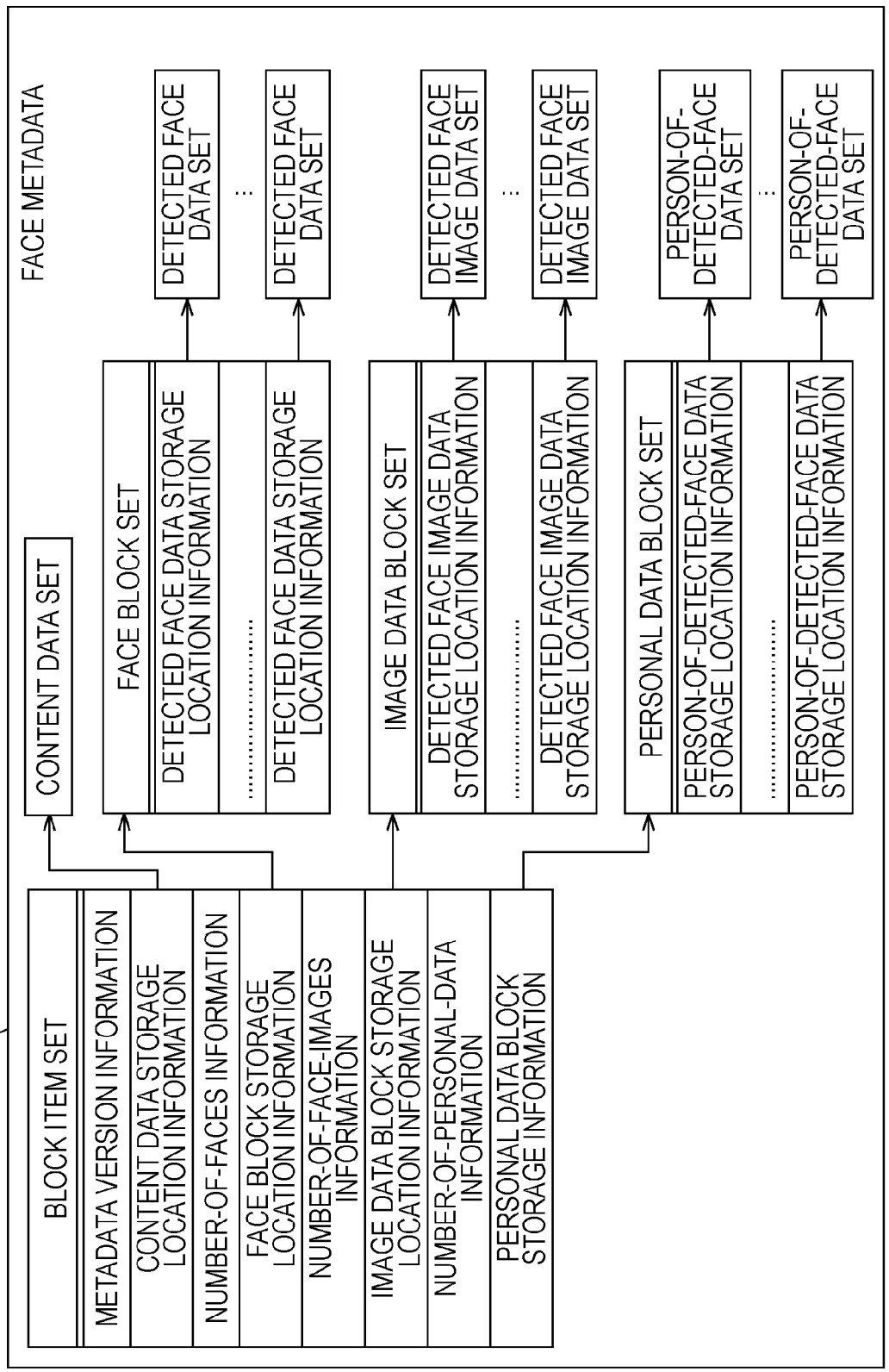
FIG. 4 is a diagram illustrating a specific example of a format of face metadata.

FIG. 4 is a diagram illustrating a specific example of a format of the face metadata 131. The face metadata 131 includes one block item set, one content data set, one face block set, one or more detected face data sets, one image data block set, one or more detected face image data sets, one personal data block set, and one or more person-of-detected-face data sets.

More specifically, the content data set corresponds to the content block shown in FIG. 3, the detected face data set corresponds to the face block shown in FIG. 3, the detected face image data set corresponds to the image data block shown in FIG. 3, and the person-of-detected-face data set corresponds to the personal data block shown in FIG. 3.

The block item set, the content data set, the face block set, each detected face data set, the image data block set, each detected face image data set, the personal data block set, and each person-of-detected-face data set are respectively stored in physically adjacent storage areas in the storage medium 35.

Hereinafter, when it is not necessary to distinguish among the block item set, the content data set, the face block set, the detected face data set, the image data block set, the detected face image data set, the personal data block set, and the person-of-detected-face data set, a simple expression "data set" or "data sets" will be used.

Each set of information or data of the face metadata 131, i.e., any of the content data set, the face block set, each detected face data set, the image data block set, each detected face image data set, the personal data block set, or each person-of-detected-face data set includes information pointing to another set other than the present set, i.e., information indicating the location at which the set other than the present set is stored in the storage medium 35, and includes actual data which itself has a meaning.

As described above, storage location information is information indicating a storage location in the storage medium 35, i.e., information pointing to a set other than a present set.

More specifically, for example, storage location information indicates a start address of an area in which the face metadata 131 is stored and indicates an offset (a difference) of a start address of an area in which a particular set pointed to by the storage location information is stored, with respect to the start address of the area in which the face metadata 131 is stored. Still more specifically, for example, the start address of the area in which the face metadata 131 is stored is given by a start address of an area in which the block item set is stored, and thus the storage location information indicates the offset of the start address of the area in which the particular data set pointed to by the storage location information is stored, with respect to the start address of the area in which the block item set is stored.

The storage location information may indicate an offset of a physical address or a logical address. The storage location information may directly indicate the start address of an area in which a particular data set pointed to by the storage location information is stored.

FIG. 5 is a diagram illustrating a format of storage location information in the face metadata 131. As shown in FIG. 5, the storage location information includes a tag having an uniquely assigned number, a type indicating that the information description type is undefined, a count having a value corresponding to the data size of data or information pointed to by the present storage location information, and a content indicating the offset to the storage location of the data pointed to by the present storage location information (the start address of an area in which the data pointed to by the present storage location information is stored).

In the storage location information, the tag, the type, the count, and the content each have fixed data sizes (fixed data lengths), and thus the storage location information has a fixed data size (fixed data length).

The "uniquely assigned number" refers to a number uniquely assigned to each piece of information or data included in the face metadata 131.

"UNDEFINED" indicates that any format is allowed for information or data. The "count" indicates the data size, in units of, for example, bytes, of data pointed to by the storage location information.

Of information/data included in the face metadata 131, information/data other than the storage location information is metadata, i.e., actual data.

FIG. 6 is a diagram illustrating a format of actual data in the face metadata 131. As shown in FIG. 6, the actual data includes a tag indicating an uniquely assigned number, a type indicating the data type of the present actual data such as an integer type or a floating-point type, a count indicating a value corresponding to the number of metadata (the number of metadata included as the content in the present actual data of the structure), and a content which is actual metadata of the present actual data.

In the actual data, the tag, the type, the count, and the content each have fixed data sizes (fixed data lengths), and thus the actual data has a fixed data size (fixed data length).

Referring again to FIG. 4, the block item set includes an information/data set of metadata version information, content data storage location information, number-of-faces information, face block storage location information, number-of-face-images information, image data block storage location information, number-of-personal-data information, and personal data block storage location information.

That is, the block item set includes frequently used metadata in the face metadata 131 and storage location information indicating the storage locations of the content data set, the face block set, the image data block set, and the personal data block set. Use of the block item set configured in the above-described manner makes it possible to practically more quickly read particular necessary metadata included in the face metadata 131. Information indicating the number of data such as the number-of-faces information, the number-of-face-images information, or the number-of-personal-data information is likely to be frequently used, for example, when contents are classified by the number of persons appearing in contents. Therefore, the information indicating the number of data is placed in the block item set which is read first of all data sets included in the face metadata 131.

As described above with reference to FIG. 5, each storage location information includes information indicating the data size, and thus the block item set indicates the data size of each of the content data set, the face block set, the image data block set, and the personal data block set.

Each data/information included in the block item set is described below. The metadata version information is actual data (metadata) indicating the version of the face metadata 131. The content data storage location information is storage location information indicating a location at which a content data set is stored in the storage medium 35 and also indicating the data size of the content data set.

The number-of-faces information is actual data (metadata) indicating the number of face images which are included in face images detected from a content and to which metadata is added as a detected face data set. That is, the number-of-faces information indicates the number of detected face data sets.

The face block storage location information is storage location information indicating a location at which a face block set is stored in the storage medium 35 and also indicating the data size of the face block set.

The number-of-face-images information is actual data (metadata) indicating the number of face images which are part or all of face images detected from a content and for each of which face image data has been stored as a detected face image data set. That is, the number-of-face-images information indicates the number of detected face image data sets.

The image data block storage location information is storage location information indicating a location at which an image data block set is stored in the storage medium 35 and also indicating the data size of the image data block set.

The number-of-personal-data information is actual data (metadata) indicating the number of persons which are part or all of persons of face images detected from a content and for each of which metadata has been stored as a person-of-detected-face data set. That is, the number-of-personal-data information indicates the number of person-of-detected-face data sets.

The personal data block storage location information is storage location information indicating a location at which a personal data block set is stored in the storage medium 35 and also indicating the data size of the personal data block set.

The content data set is an information/data set of metadata (actual data) associated with each content.

The content data set includes metadata (actual data) indicating the version of the face detection engine, the version of the face recognition engine, an image content update date/time, original data for face metadata information, number-of-persons information, change-in-the-number-of-persons information, and a content time scale.

The version of the face detection engine indicates the version of the face detection engine which has detected a face image from a content. When the digital camera 11 acquired a content to which face metadata 131 was added by another device, the version of the face detection engine is checked to determine whether the face metadata 131 is based on a face image detected by a face detection engine of a version older than the version of the face detection engine 121. If it is determined that the face metadata 131 is based on a face image detected by a face detection engine of an older version, the face detection engine 121 detects a face image from the content and produces new face metadata 131.

This makes it possible to detect a face image with higher accuracy and obtain face metadata 131 with higher accuracy.

The version of the face recognition engine indicates the version of the face recognition engine which identifies a person of a face of a detected face image. To identify a person of a face of a detected face image, it is needed that the digital camera 11 has a database in which image data of persons to be recognized (registered persons) such as MR. A is stored, or it is necessary to supply image data of Mr. A to the digital camera 11. As with the version of the face detection engine, the version of the face recognition engine is detected to determine whether the face metadata 131 is based on face image recognition performed by a face recognition engine of a version older than the version of the face recognition engine 122. In a case where it is determined that the face metadata 131 is based on face image recognition performed by a face recognition engine of an older version, the face recognition engine 122 recognizes the face image of the content and produces new face metadata 131.

This makes it possible to recognize a face image with higher accuracy and obtain face metadata 131 with higher accuracy.

The image content update date/time is an update date/time indicated by information added to the content as of the point of time at which the face metadata 131 was produced. When a content is edited, for example, to change an image size, the content update date/time, which is described in a storage area separately from the face metadata 131, is updated. Therefore, by comparing the content update date/time which is information added to the content with the image content date/time using the image content update date/time, it is possible to detect inconsistency with the face metadata 131, which may occur, for example, if the face metadata 131 is not updated when the content is updated.

The original data for face metadata information indicates content data from which the face metadata 131 originates. For example, in the digital camera 11, when face metadata 131 is produced and stored, original data for face metadata information indicates whether the face metadata 131 has been produced from a captured image, i.e., an image of image data stored in the storage medium 35 (in other words, from a content itself) or the face metadata 131 has been produced from a monitoring image, i.e., an image displayed on the LCD 39.

For example, the face metadata 131 including original data for face metadata information indicating that this face metadata 131 has been produced from the monitoring image is produced by detecting a face image from an image which was displayed on the LCD 39 in a state in which a not-shown shutter button of the digital camera 11 was half-pressed and auto focus was locked.

The reason why the face metadata 131 is produced from the monitoring image is as follows. When a plurality of images are continuously taken, there is a possibility that the processing speed is too slow to store captured images or electric power necessary to detect face images while storing captured images cannot be supplied from a battery. Even in such a case, use of the monitoring image ensures that the face metadata 131 is produced.

There is a possibility that a slight difference in position or size occurs between a captured face image and a monitoring face image. When the original data for face metadata information is referred to, if the original data for face metadata information indicates that a face image is detected from a monitoring image, this face image may not be displayed, or, in a case where a device is capable of re-detecting a face image, a face image may be re-detected from a content.

As of the time at which the face metadata 131 was produced, the number-of-persons information indicates the number of face images detected by the face detection engine 121. If the face metadata 131 is edited by a user, the number-of-persons information is updated so as to indicate a number specified by the user in accordance with the operation performed in the editing by the user. When a user sees a displayed content, if the user finds that the number of faces actually included in the displayed content is different from the number of face images detected by the face detection engine 121, a number input by a user is set in the number-of-persons information if the user wants to record the correct number of faces for use at a later time.

The change-in-the-number-of-persons information indicates whether the number-of-persons information represents the number of face images detected by the face detection engine 121 or the number specified by a user. By default, the change-in-the-number-of-persons information is set to a value indicating that the number-of-persons information represents the number of face images detected by the face detection engine 121. Use of the change-in-the-number-of-persons information makes it possible to disable re-detection of a face image by the face detection engine, or disable prompting to change the number-of-persons information or rewriting of number-of-persons information.

The content time scale indicates a time unit for use in motion images. For example, the content time scale indicates that the clock provides 90000 ticks per second as time units for use in motion images. In this specific case, when a motion image includes 60 frames per second, times of two adjacent frames are indicated by clock values different by 15000.

Next, the face block set and the detected face data set are explained.

The face block set is an information/data set of one or more pieces of detected face data storage location information. Each detected face data storage location information included in the face block set indicates a location at which each detected face data set is stored or is to be stored in the storage medium 35.

That is, one piece of detected face data storage location information indicates a location at which one detected face data set is stored.

The number of pieces of detected face data storage location information included in the face block set is the same as the number of detected face data sets put in the face metadata 131. Therefore, the number-of-faces information in the block item set can be regarded as indicating the number of pieces of detected face data storage location information included in the face block set.

The detected face data set is an information/data set of metadata associated with a face image detected from a content.

The detected face data set includes a detected face ID, face location information, face angle information, face part information, face score information, expression score information, face importance level information, application information, face importance level update information, person appearing time information, and face location time information.

The detected face ID is an ID identifying a detected face image. The detected face ID is added for each detected face image. The detected face ID is locally valid only in a content. The detected face ID is used to relate a detected face data set to a detected face image data set or a person-of-detected-face data set.

The face location information indicates the location of a detected face image. More specifically, the face location information indicates the location and the size of a face image in coordinates with respect to the upper left point of a content image. That is, the face location information is information indicating the location and the size of a face image in a content.

The size of a face image is indicated by a height and a width of a face image represented in a given coordinate system. The face location information is the most important information of all information included in the face metadata 131, and the face location information is usable in various applications. For example, in a device which does not have the capability of producing face image data of a detected face image, an image with a size and a location indicated by the face location information is clipped from a content and displayed as a face image.

The face angle information indicates the angle of a face of a detected face image with respect to a normal front direction. For example, the face angle information is used in a face recognition process such that, because image data of faces oriented in the normal front direction has been registered, a detected face image is corrected according to the face angle information such that the face is in the normal front direction, and the resultant corrected face image is compared with registered face images.

The face part information indicates locations of eye images, a nose image, and a mouth image in a detected face image. The face part information is used for a similar purpose to the face angle information. That is, part or all of eye images, a nose image, and a mouth image in a detected face image is corrected by using the face part information as with the face angle information such that the face angle comes in a normal front direction, and the resultant corrected face image is compared with registered face images. The face part information may also be used to decorate a face image, for example, such that a mustache is added, below a nose, to an original face image.

The face score information indicates likeness, to human face, of a face image detected by the face detection engine 121. The face score information is used, for example, as follows. When the face score information has a high value, that is, when the face score information indicates that a face of a detected face image is highly likely to be a human face, the face image is clipped and output. Conversely, when the face score information has a low value, that is, when the face score information indicates that a face of a detected face image is highly likely not to be a human face, the face image is not clipped and not output.

The expression score information indicates a score of a detected face image in terms of the expression of the face, such as a smiling expression, an angry expression, or a sad expression. For example, the expression score information is used in an application in which a face with a high smiling score is preferentially displayed.

The face importance level information indicates the importance of a face image in a plurality of face images detected from a content. For example, in an operation of taking an image, when a face image is detected and a focus is on the detected face image, the face image on which the focus is on is highly likely to be sharp. In this case, the face importance level information for this face image is set to a value indicating that this face image is of high importance. Conversely, a non-focused face image is highly likely to be blurred, and thus the face importance level information for such a face image is set to a value indicating low importance. The face importance level information is used, for example, in an application in which face images are displayed preferentially in the descending order of the importance indicated by the face importance level information.

The application information indicates an application by which face metadata of interest has been produced. For example, in the case where face metadata is produced by a face detection/focus application in which when an image is captured, a face image is detected and a focus is placed on the detected face image, the application information is produced so as to indicate the face detection/focus application. By using a combination of the application information and the face importance level information, it is possible to determine for which application, the importance level indicated by the face importance level information was determined.

The face importance level update information, as with the change-in-the-number-of-persons information, indicates whether the face importance level information indicates importance specified by a user. That is, the face importance level update information indicates whether the face importance level information has been rewritten by a user. By default, the face importance level update information is set to a value indicating that the face importance level information has a value determined whether focus is on a face image of interest. If the face importance level information is changed by a user according to his/her own judgment, for example, if the face importance level information is set to a value indicating high importance for a face image, in a blurred state, of a particular person such as a friend, the face importance level update information has a non-default value. An application may use the face importance level update information such that rewriting of the face importance level information is disabled depending on the face importance level update information.

The person appearing time information is used, in a motion image content, to indicate a time period during which a particular person appears in the motion image. For example, the person appearing time information is used in playlist playback to play back a motion image which was clipped from an original motion image and in which a particular person such as Mr. A appears who is one of persons appearing in the original motion image.

The face location time information indicates, in a motion image content, a time of a representative point in a period in which a face image is detected. In the case of a motion image content, when, for example, Mr. A who is one of persons appearing in the content appears in a particular period, only metadata of a frame at a representative point in the period is stored in the face metadata 131 without storing as many metadata as there are frames in this particular period in the face metadata 131.

Figure 7:
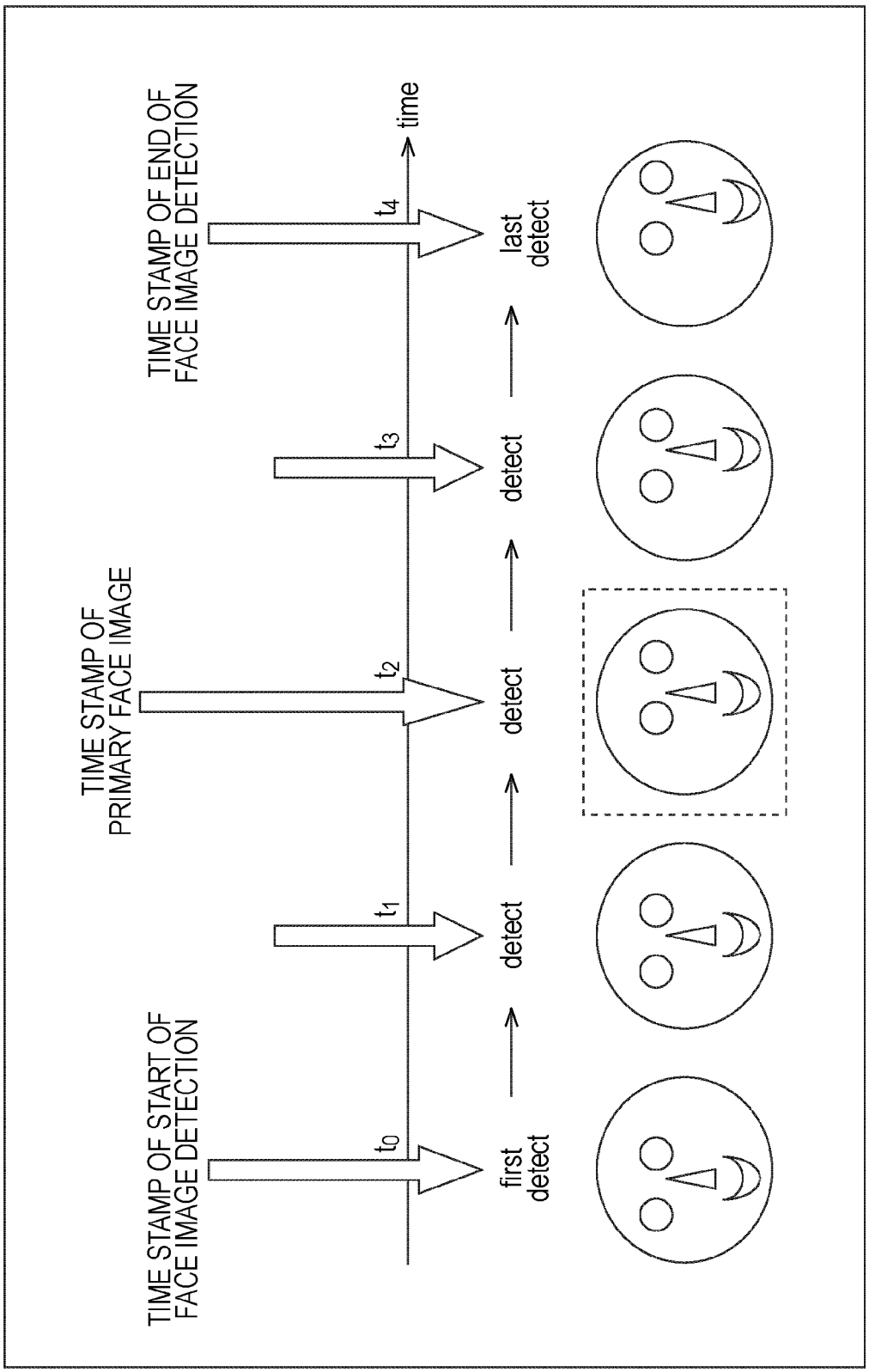
FIG. 7 is a diagram illustrating examples of a representative location and a representative image.

For example, as shown in FIG. 7, if detection of a face of Mr. A starts at a time t0, and if a face of Mr. A is again detected at a time t1 after a predetermined interval from the time t0, then a determination is made as to whether the face of the face image detected at time t1 is the same as the face of Mr. A included in the face image detected at time t0. If the determination result is affirmative, then, the face image detection is further performed at a time t2 after a predetermined interval from time t1, and a determination is made as to whether the face of the face image detected at time t2 is the same as the face of Mr. A detected at time t1. If the determination result is affirmative, the face detection process is performed in a similar manner at time t3 after a predetermined interval from time t2, at time t4 after a predetermined interval from time t3, and so on. That is, the face detection process is performed at predetermined intervals of time thereby to detect a period during which Mr. A appears in the motion image content.

In the example shown in FIG. 7, time t2 at which a face image in a dashed-line box is detected is selected as a representative location in the period, and the face image detected at time t2 is selected as a representative image. The representative location of a period is given, for example, by a time at which a face image with a highest smile score among smile scores detected during this period is detected, or given by a time at which a face image of a face with an angle closest to a front direction among angles detected during the period is detected. That is, a face image with a highest smile score or a face image with an angle closest to the front direction is selected as the representative image, and the face location time information indicates the time at which the representative face image is obtained.

Next, the image data block set and the detected face image data set are explained.

Referring again to FIG. 4, the image data block set is an information/data set of one or more pieces of detected face image data storage location information. Each detected face image data storage location information included in the image data block set indicates a location at which a detected face image data set is stored or is to be stored in the storage medium 35.

That is, each detected face image data storage location information indicates a location at which one detected face image data set is stored.

The number of pieces of detected face image data storage location information included in the image data block set is the same as the number of detected face image data sets included in the face metadata 131. Therefore, the number-of-face-images information in the block item set can be regarded as indicating the number of pieces of detected face image data storage location information included in the image data block set.

The detected face image data set is an information/data set of face image data of a face image detected from a content.

The detected face image data set includes a detected face image ID, face image data, and face image size information.

The detected face image ID is an ID identifying a detected face image data set corresponding to a detected face data set, that is, an ID identifying a detected face image data set in which there is put face image data of the same face image as the face image for which metadata is added as the detected face data set. The detected face image ID has the same value as the value of the detected face ID in the detected face data set corresponding to the detected face image data set.

The face image data is image data of a face image produced from a content according to the face location information. When a face image is displayed, the face image data is used to quickly displaying the face image without having to produce image data of the face image from a content according to the face location information in the corresponding detected face data set.

The face image size information indicates the height and the width of a face image displayed using face image data.

Next, the personal data block set and the person-of-detected-face data set are explained.

The personal data block set is an information/data set of one or more pieces of person-of-detected-face data storage location information. Each person-of-detected-face data storage location information included in the personal data block set indicates a location at which a person-of-detected-face data set is stored or is to be stored in the storage medium 35.

That is, each person-of-detected-face data storage location information indicates a location at which one person-of-detected-face data set is stored.

The number of pieces of person-of-detected-face data storage location information included in the personal data block set is the same as the number of person-of-detected-face data sets included in the face metadata 131. Therefore, the number-of-personal-data information in the block item set can be regarded as indicating the number of pieces of person-of-detected-face data storage location information included in the personal data block set.

The person-of-detected-face data set is an information/data set of metadata associated with a person whose face image was detected from a content.

The person-of-detected-face data set includes a person-of-detected-face ID, personal information, personal information update information, and person score information.

The person-of-detected-face ID is an ID identifying a person-of-detected-face data set corresponding to a detected face data set, that is, an ID identifying a person-of-detected-face data set in which there is put metadata associated with the same person as a person whose face was taken as a face image (a person whose face image was taken) for which metadata is added as the detected face data set. The person-of-detected-face ID has the same value as the value of the detected face ID in the detected face data set corresponding to the person-of-detected-face data set identified by this person-of-detected-face ID.

Figure 8:
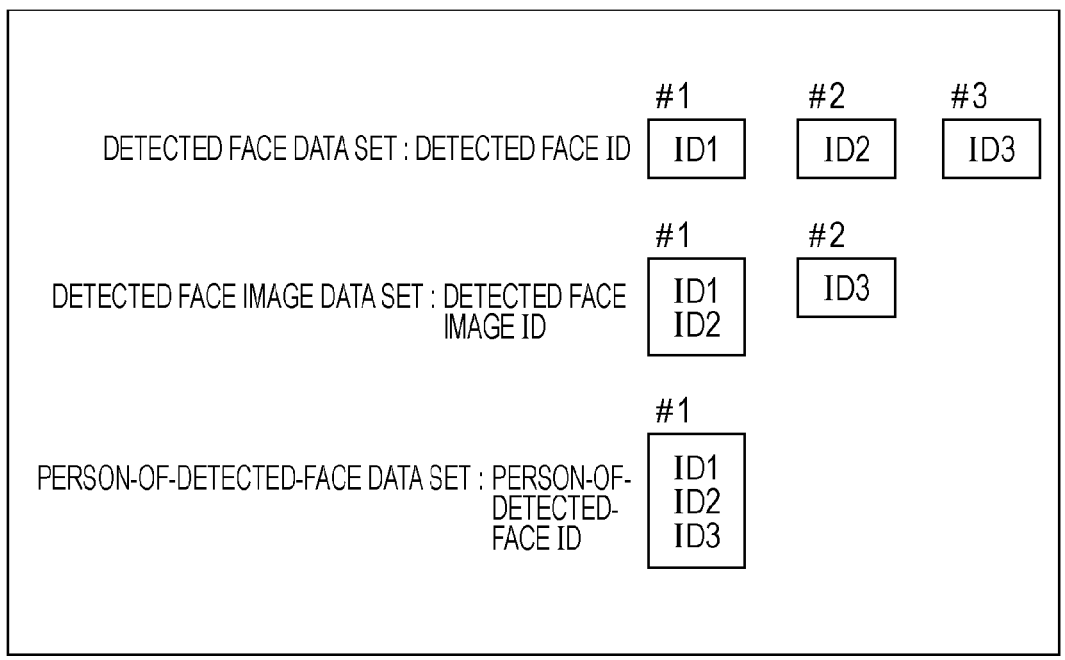
FIG. 8 is a diagram illustrating examples of a detected face ID, a detected face image ID, and a person-of-detected-face ID.
Figure 9:
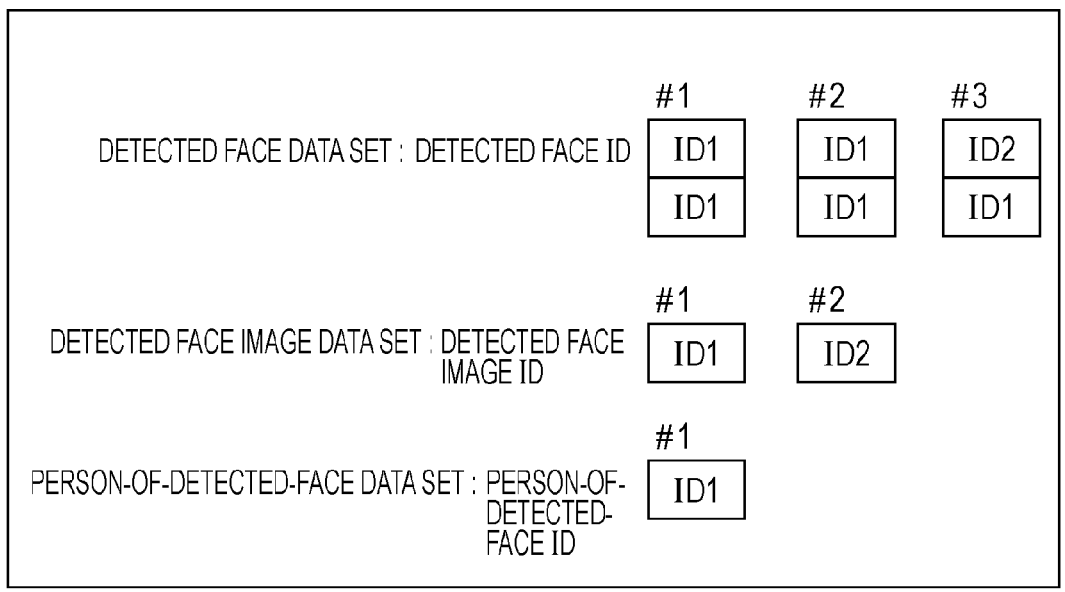
FIG. 9 is a diagram illustrating examples of a detected face ID, a detected face image ID, and a person-of-detected-face ID.

Referring to FIG. 8 and FIG. 9, examples of a detected face ID, a detected face image ID, and a person-of-detected-face ID are described below.

For example, as shown in FIG. 8, detected face IDs, detected face image IDs, and person-of-detected-face IDs are respectively put in a detected face data set, a detected face image data set, and a person-of-detected-face data set. A plurality of detected face image IDs may be put in a single detected face image data set, and a plurality of person-of-detected-face IDs may be put in a single person-of-detected-face data set.

In the example shown in FIG. 8, ID1 is put as a detected face ID in a detected face data set #1, ID2 is put as a detected face ID in a detected face data set #2, and is put as a detected face ID in a detected face data set #3. ID1, ID2, and ID3 are put as detected face person IDs in a detected face image data set #1, and ID3 is put as a detected face image ID in a detected face image data set #2. ID1, ID2, and ID3 are put as person-of-detected-face IDs in a person-of-detected-face data set #1.

Because a detected face image ID in the detected face image data set #1 is ID1 which is the same as ID1 of the detected face ID in the detected face data set #1, the detected face image data set #1 includes face image data of a representative face image whose metadata is described in the detected face data set #1. That is, the detected face image data set #1 corresponds to the detected face data set #1.

Because a detected face image ID in the detected face image data set #1 is ID2 which is the same as ID2 of the detected face ID in the detected face data set #2, the detected face image data set #1 includes face image data of a representative face image whose metadata is described in the detected face data set #2. That is, the detected face image data set #1 corresponds to the detected face data set #2.

The detected face image ID in the detected face image data set #2 is ID3 which is the same as ID3 of the detected face ID in the detected face data set #3, and thus the detected face image data set #2 includes face image data of a representative face image whose metadata is described in the detected face data set #3. That is, the detected face image data set #2 corresponds to the detected face data set #3.

A detected face image ID in the person-of-detected-face data set #1 is ID1 which is the same as ID1 of the detected face ID in the detected face data set #1, and thus the person-of-detected-face data set #1 includes metadata associated with the same person as the person whose face was photographed as the face image whose metadata is described in the detected face data set #1. That is, the person-of-detected-face data set #1 corresponds to the detected face data set #1.

A person-of-detected-face ID in the person-of-detected-face data set #1 is ID2 which is the same as ID2 of the detected face ID in the detected face data set #2, and thus the person-of-detected-face data set #1 includes metadata associated with the same person as the person whose face was photographed as the face image whose metadata is described in the detected face data set #2. That is, the person-of-detected-face data set #1 corresponds to the detected face data set #2.

A person-of-detected-face ID in the person-of-detected-face data set #1 is ID3 which is the same as ID3 of the detected face ID in the detected face data set #3, and thus the person-of-detected-face data set #1 includes metadata associated with the same person as the person whose face was photographed as the face image whose metadata is described in the detected face data set #3. That is, the person-of-detected-face data set #1 corresponds to the detected face data set #3.

By assigning sequential numbers to the detected face IDs, the detected face image IDs, and the person-of-detected-face IDs, it becomes possible to quickly search for a detected face ID having the same value as the value of a detected face image ID or a person-of-detected-face ID simply by sequentially checking the detected face IDs.

Alternatively, as shown in FIG. 9, detected face IDs, detected face image IDs, and person-of-detected-face IDs may be respectively described in a detected face data set, a detected face image data set, and a person-of-detected-face data set such that detected face IDs have values by which to make comparison with detected face image IDs and person-of-detected-face IDs.

In the example shown in FIG. 9, values of detected face IDs shown in upper boxes are values by which to make comparison with detected face image IDs (hereinafter, these will be referred to as detected face $ID_1$), while values of detected face IDs shown in lower boxes are values by which to make comparison with person-of-detected-face IDs (hereinafter, these will be referred to as detected face $ID_2$).

In the example shown in FIG. 9, a detected face data set #1 includes a detected face $ID_1$ as ID1 and a detected face $ID_2$ as ID1, a detected face data set #2 includes a detected face $ID_1$ as ID1 and a detected face $ID_2$ as ID1, and a detected face data set #3 includes a detected face $ID_1$ as ID2 and a detected face $ID_2$ as ID1. Furthermore, a detected face image data set #1 includes ID1 as a detected face image ID, and a detected face image data set #2 includes ID2 as a detected face image ID. A person-of-detected-face data #1 includes ID1 as a person-of-detected-face ID.

ID1 of the detected face image ID of the detected face image data set #1 is the same as $ID_1$ of the detected face ID1 of the detected face data set #1, the detected face image data set #1 includes face image data of a representative face image whose metadata is described in the detected face data set #1. That is, the detected face image data set #1 corresponds to the detected face data set #1.

ID1 of the detected face image ID of the detected face image data set #1 is the same as $ID_1$ as the detected face ID1 of the detected face data set #2, the detected face image data set #1 includes face image data of a representative face image whose metadata is described in the detected face data set #2. That is, the detected face image data set #1 corresponds to the detected face data set #2.

ID2 of the detected face image ID of the detected face image data set #2 is the same as $ID_1$ as the detected face of the detected face data set #3, and thus the detected face image data set #2 includes face image data of a representative face image whose metadata is described in the detected face data set #3. That is, the detected face image data set #2 corresponds to the detected face data set #3.

ID1 of the person-of-detected-face ID of the person-of-detected-face data set #1 is the same as $ID_2$ of the detected face ID1 of the detected face data set #1, and thus the person-of-detected-face data set #1 includes metadata associated with the same person as the person whose face was photographed as the face image whose metadata is described in the detected face data set #1. That is, the person-of-detected-face data set #1 corresponds to the detected face data set #1.

ID1 of the person-of-detected-face ID of the person-of-detected-face data set #1 is the same as $ID_2$ of the detected face ID1 of the detected face data set #2, and thus the person-of-detected-face data set #1 includes metadata associated with the same person as the person whose face was photographed as the face image whose metadata is described in the detected face data set #2. That is, the person-of-detected-face data set #1 corresponds to the detected face data set #2.

ID 1 of the person-of-detected-face ID of the person-of-detected-face data set #1 is the same as $ID_2$ of the detected face ID1 of the detected face data set #3, and thus the person-of-detected-face data set #1 includes metadata associated with the same person as the person whose face was photographed as the face image whose metadata is described in the detected face data set #3. That is, the person-of-detected-face data set #1 corresponds to the detected face data set #3.

In this scheme, the detected face IDs, the detected face image IDs, and the person-of-detected-face IDs each have a fixed length. This makes it possible to easily read each of the detected face IDs, the detected face image IDs, and the person-of-detected-face IDs.

Referring back to the explanation of the person-of-detected-face data set, the personal information is information associated with a person whose face was photographed as a face image, and the personal information indicates, for example, the name, the age, the sex, and/or the mail address of the person.

The personal information update information indicates whether the personal information has been updated by a user.

The person score information indicates the confidence level of a face recognition performed by the face recognition engine 122 for a particular person. For example, when the face recognition engine 122 determines as a result of face recognition that a face image is of Mr. A, the person score information indicates the confidence level for the face image to be of Mr. A. The higher the score indicated by the person score information, the higher the probability that the person is correctly recognized from the face image.

Personal data such as the name, the age, the sex, the mail address, etc. of each registered person such as Mr. A are stored in the database which is managed by the face recognition engine 122 or which operates in cooperation with the face recognition engine 122. In a case where as a result of the face image recognition performed by the face recognition engine 122, the person score information has a higher score for Mr. A than scores for any other person, the person score information is set so as to indicate that the face image is very likely to be of Mr. A, and the name, the age, the sex, and the mail address of Mr. A are described in the personal information.

However, if a user determines from the displayed face image that the face image is not of Mr. A but of Mr. K, and thus if the user rewrites the personal information so as to correctly indicate the personal information about Mr. K, then the personal information update information is updated. As described above, the personal information update information indicates that the personal information has been changed.

As described above, the face metadata 131 includes a block item set, a content data set, a face block set, one or more detected face data sets, an image data block set, one or more detected face image data sets, a personal data block set, and one or more person-of-detected-face data sets. The block item set is configured such that the block item set includes storage location information indicating storage locations of the content data set, the face block set, the image data block set, or the personal data block set, the face block set includes storage location information indicating a storage location of each of one or more detected face data sets, the image data block set includes storage location information indicating a storage location of each of one or more detected face image data sets, and the personal data block set includes storage location information indicating a storage location of each of one or more person-of-detected-face data sets.

Thus, among the block item set, the content data set, one or more detected face data sets, one or more detected face image data sets, and one or more person-of-detected-face data sets in which metadata are described as actual data, it is possible to quickly read only a set in which necessary metadata is located.

Figure 10:
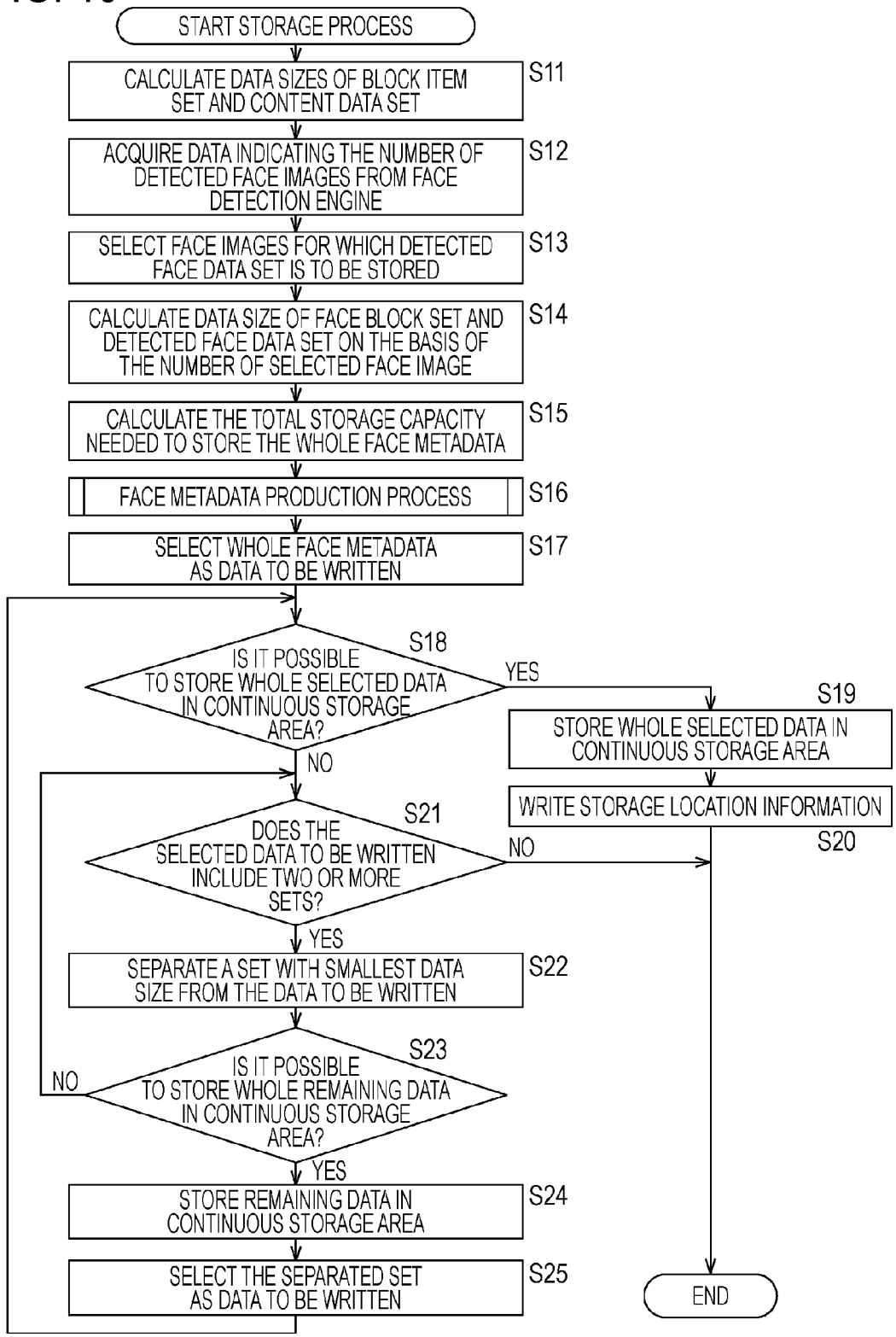
FIG. 10 is a flow chart illustrating a process of storing face metadata.

Referring to a flow chart shown in FIG. 10, a process of storing face metadata 131 including detecting a face image from a content and recognizing the detected face image is explained below.

In step S11, the storage controller 123 calculates the data size of the block item set and that of the content data set. The information or data described in the block item set or the content data set is determined in the digital camera 11, and thus the data size is fixed regardless of the number of face images detected from a content. Therefore, the block item set and the content data set each have a fixed length. That is, in step S11, the storage controller 123 calculates the data size of the block item set and that of the content data set each having the fixed data length.

In step S12, the storage controller 123 acquires data indicating the number of detected face images from the face detection engine 121.

In step S13, the storage controller 123 selects face images whose detected face data set should be stored, from face images detected by the face detection engine 121 in accordance with a predetermined rule. For example, the storage controller 123 sorts smile scores of the face images detected by the face detection engine 121 in the descending order from a highest smile score, and the storage controller 123 selects face images having smile scores within a predetermined highest range as face images whose detected face data set should be stored. More specifically, for example, the storage controller 123 selects five face images having highest smile scores from a total of ten person's face images as face images whose detected face data set should be stored.

Alternatively, for example, the storage controller 123 may select, from the detected face images, a predetermined number of face images in the descending order of the face image size starting from a greatest face image size and the storage controller 123 may employ the selected face images as the face images whose detected face data set should be stored. Still alternatively, the storage controller 123 may select, from the detected face images, face images having high importance levels on the basis of the face importance level information, and may employ the selected face images as the face images whose detected face data set should be stored.

As described above, by limiting the number of face images whose detected face data set is stored, it becomes possible to prevent metadata unnecessary for a user from being uselessly stored, and thus it becomes possible to reduce the data size of the face metadata 131.

That is, in this case, the number of face images detected by the face detection engine 121 is stored as the number-of-persons information associated with the content data set, while the number of face images for each of which detected face data set is actually stored, i.e., the number of detected face data sets is stored as the number-of-faces information associated with the block item set, and thus a user can know whether the number of face images for each of detected face data set is stored is limited or not, by checking the number-of-faces information and the number-of-persons information.

In step S14, the storage controller 123 calculates the data size of the face block set and that of the detected face data set on the basis of the number of the selected face images. The face block set includes as many pieces of detected face data storage location information as there are detected face data sets, and each piece of detected face data storage location information has the fixed length, and thus, it is possible to calculate the data size of the face block set from the number of face images selected in step S13 for which a detected face data set is to be stored. More specifically, the data size of the face block set is given by the product of the number of selected face images and the data size of one piece of detected face data storage location information.

Metadata described in the detected face data set is predetermined, and metadata described in each detected face data set is fixed-length actual data having the format described above with reference to FIG. 6, and thus the data size of each detected face data set is given by the product of the number of metadata described in the detected face data set and the data size of one metadata.

In step S15, the storage controller 123 calculates the data size of each of the image data block set, the detected face image data set, the personal data block set, and the personof-detected-face data set, and the storage controller 123 then calculates the storage capacity necessary to store the whole face metadata 131.

The image data block set, the detected face image data set, the personal data block set, and the person-of-detected-face data set each include fixed-length storage location information or fixed-length metadata (actual data), and thus a calculation is perform as to the data size of each of the image data block set, the detected face image data set, the personal data block set, and the person-of-detected-face data set, based on the number of pieces of storage location information or metadata.

The detected face image data set may be described only for particular one or more face images selected from face images detected by the face detection engine 121. The person-of-detected-face data set may be described only for particular one or more face images selected from face images detected by the face detection engine 121.

In step S16, the storage controller 123 produces the face metadata 131.

Figure 11:
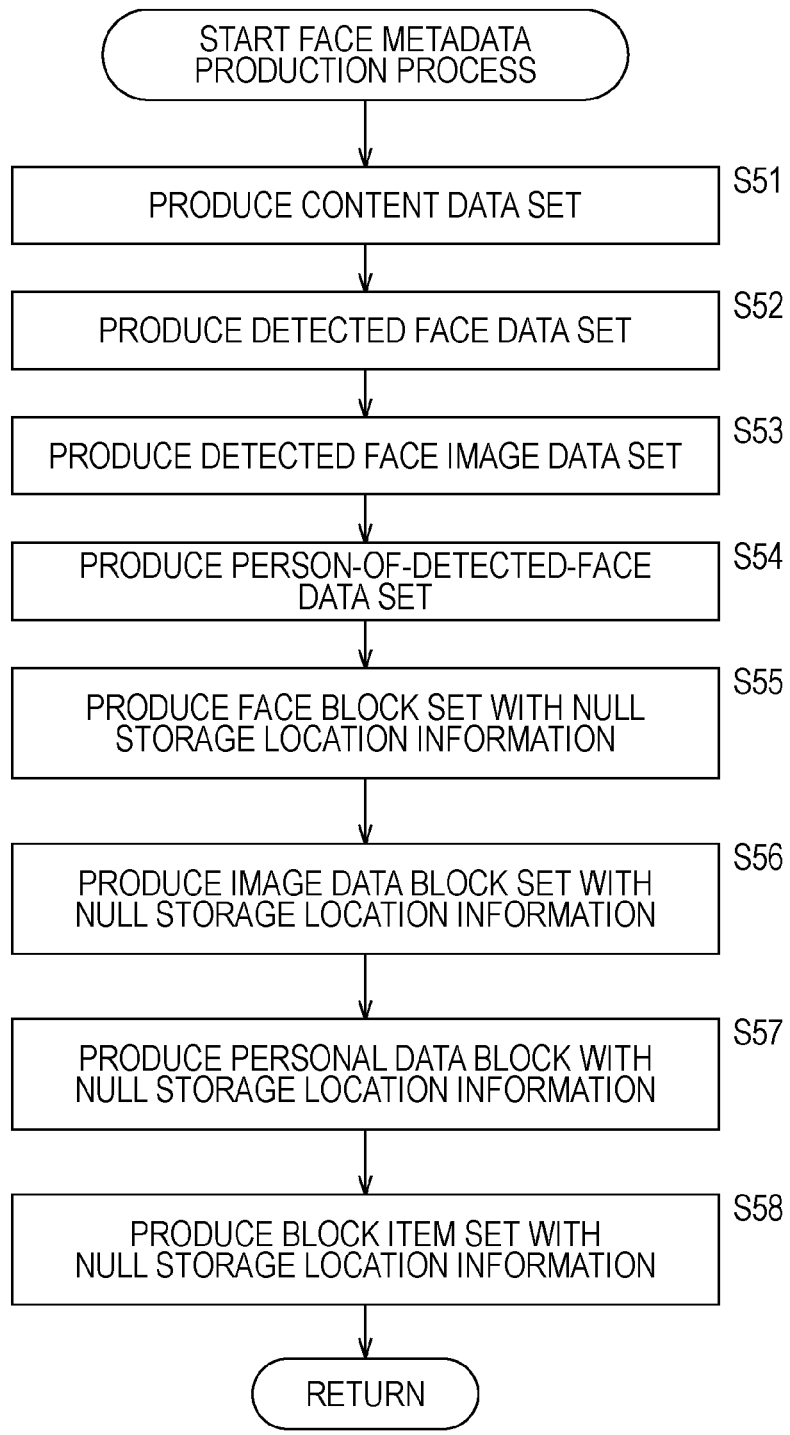
FIG. 11 is a flow chart illustrating a process of generating face metadata.

Referring to a flow chart shown in FIG. 11, details of the process of producing the face metadata 131 are described below.

In step S51, the content data set generator 142 of the storage controller 123 generates a content data set including metadata (actual data) such as the version of the face detection engine, the version of the face recognition engine, an image content update date/time, original data for face metadata information, number-of-persons information, change-in-the-number-of-persons information, and a content time scale.

In step S52, the detected face data set generator 144 of the storage controller 123 produces a detected face data set including a detected face ID, face location information, face angle information, face part information, face score information, expression score information, face importance level information, face importance level update information, person appearing time information, and face location time information.

In step S53, the detected face image data set generator 146 of the storage controller 123 produces a detected face image data set including a detected face image ID, face image data, and face image size information.

In step S54, the person-of-detected-face data set generator 148 of the storage controller 123 produces a person-of-detected-face data set including a person-of-detected-face ID, personal information, personal information update information, and person score information.

In step S55, the face block set generator 143 of the storage controller 123, produces a face block set having null storage location information as detected face data storage location information.

Herein, the null storage location information refers to storage location information for which only allocation of a storage area has been performed. More specifically, in the storage location information, as shown in FIG. 5, an uniquely assigned number is set in a tag field, UNDEFINED is set in a type field, and a data size is set in a count field. In a content field of the storage location information, a particular value (for example, "0000") is stored to indicate that the content is null. Thus, the face block set including such storage location information as the detected face data storage location information is produced.

In step S56, the image data block set generator 145 of the storage controller 123 produces an image data block set having null storage location information as detected face image data storage location information.

In step S57, the personal data block set generator 147 of the storage controller 123 produces a personal data block set having null storage location information as person-of-detected-face data storage location information.

In step S58, the block item set generator 141 of the storage controller 123 generates a block item set including metadata version information, content data storage location information, number-of-faces information, face block storage location information, number-of-face-images information, image data block storage location information, number-of-personal-data information, personal data block storage location information, and null storage location information, i.e., null content data storage location information, null face block storage location information, null image data block storage location information, and null personal data block storage location information. If the producing of the block item set is completed, the process of producing the face metadata 131 is ended.

As described above, in the process of producing the face metadata 131, the face metadata 131 including null storage location information is produced. That is, the face metadata 131 including storage location information for which only allocation of a storage area has been performed is produced.

Referring again to FIG. 10, in step S17, the storage controller 123 selects the whole produced face metadata 131 as data to be written.

In step S18, on the basis of information supplied from the medium I/F 34 indicating free storage areas in the storage medium 35 and on the basis of the to-be-written data, the storage controller 123 determines whether the whole to-be-written data can be stored in a physically continuous free storage area in the storage medium 35. If the determination result in step S18 is that the whole to-be-written data can be stored in a physically continuous free storage area in the storage medium 35, then the processing flow proceeds to step S19. In step S19, the storage controller 123 stores the whole to-be-written data in the physically continuous free storage area in the storage medium 35.

In step S20, the storage controller 123 writes storage location information in the storage medium 35 such that the written data is overwritten by the storage location information. Thus, the process is completed.

More specifically, the storage controller 123 writes storage location information in the storage medium 35 in such a manner as described below. That is, the content data storage location information with null value in the block item set is overwritten by storage location information indicating the storage location of the content data set written in the storage medium 35, and each piece of detected face data storage location information with null value in the face block set is overwritten by storage location information indicating the storage location of each of one or more detected face data sets. Furthermore, each piece of detected face image data storage location information with null value in the image data block set is overwritten by storage location information indicating the storage location of each of one or more detected face image data sets, and each piece of person-of-detected-face data storage location information with null value in the personal data block set is overwritten by storage location information indicating the storage location of each of one or more person-of-detected-face data sets. Furthermore, the null face block storage location information, the null image data block storage location information, and the null personal data block storage location information of the block item set are respectively overwritten by storage location information indicating the storage location of the face block set, storage location information indicating the storage location of the image data block set, and storage location information indicating the storage location of the personal data block set.

In the case where the determination result in step S18 is that the whole to-be-written data can not be stored in a physically continuous free storage area in the storage medium 35, it is necessary to reduce the data size of the to-be-written data. Thus, in step S21, the storage controller 123 determines whether the to-be-written data includes two or more data sets. In a case where the answer to step S21 is that the to-be-written data includes two or more data sets, it is possible to reduce the data size of the to-be-written data in units of data sets. Thus, in step S22, the storage controller 123 separates a data set with a smallest data size from the to-be-written data. That is, the data set with the smallest data size is removed from the to-be-written data.

Alternatively, in step S22, the storage controller 123 may separate a data set with a greater data size from the to-be-written data. Still alternatively, the storage controller 123 may define in advance priority for each data set, and may separate a data set from the to-be-written data in accordance with the predefined priority.

Still alternatively, in step S22, the storage controller 123 may determine the difference between the size of the storage area examined in step S18 and the data size of the to-be-written data, detect data sets with data sizes greater than the difference, and separate a data set with a smallest data size of the detected data sets from the to-be-written data.

In step S23, on the basis of information indicating free storage areas in the storage medium 35 and on the basis of the data size of the to-be-written data remaining after the separation of the data set with the smallest data size, the storage controller 123 determines whether the remaining to-be-written data can be stored in a physically continuous free storage area in the storage medium 35.

If the answer to step S23 is that the remaining to-be-written data can be stored in a physically continuous free storage area in the storage medium 35, then the processing flow proceeds to step S24. In step S24, the storage controller 123 stores the remaining to-be-written data in the physically continuous free storage area in the storage medium 35. In step S25, the storage controller 123 selects one of data sets separated in step S22 as one piece of to-be-written data. The processing flow then returns to step S18 to repeat the process described above.

In a case where the determination result in step S23 is that the remaining to-be-written data can not be stored in a physically continuous free storage area in the storage medium 35, it is necessary to further reduce the data size of the to-be-written data. Thus, the processing flow returns to step S21 to repeat the process described above.

In a case where the answer to step S21 is that the to-be-written data does not include two or more data sets, the to-be-written data includes only one data set, and thus it is impossible to reduce the data size of the to-be-written data in units of data sets, and it is impossible to store the to-be-written data such that any data set thereof is stored in a physically continuous free storage area of the storage medium 35. Thus, in this case, an error handling process is performed, for example, to provide an error message indicating that the face metadata 131 cannot be stored, and the process is ended without storing the face metadata 131.

As described above, the face metadata 131 is stored in the storage medium 35 such that any data set is stored in a physically continuous storage area of the storage medium 35.

Figure 12:
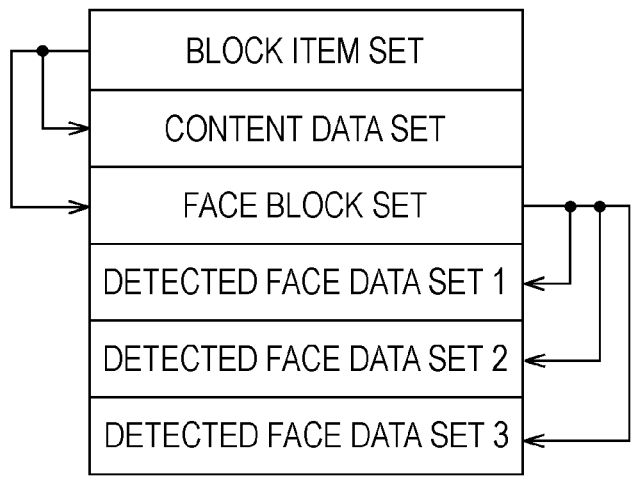
FIG. 12 is a diagram illustrating an example of a manner in which a block item set, a content data set, a face block set, and detected face data sets are all stored in a continuous storage area of a storage medium.

For example, in a case where the face metadata 131 includes a block item set, a content data set, a face block set, and three person-of-detected-face data sets 1 to 3, and the storage medium 35 has a physically continuous free storage area with a storage capacity greater than the total data size of the face metadata 131, then, as shown in FIG. 12, the block item set, the content data set, the face block set, and the detected face data sets 1 to 3 are stored in the physically continuous storage area of the storage medium 35. In this case, as described above, the block item set points to the storage locations of the content data set and the face block set, and the face block set points to the storage locations of the detected face data sets 1 to 3.

Figure 13:
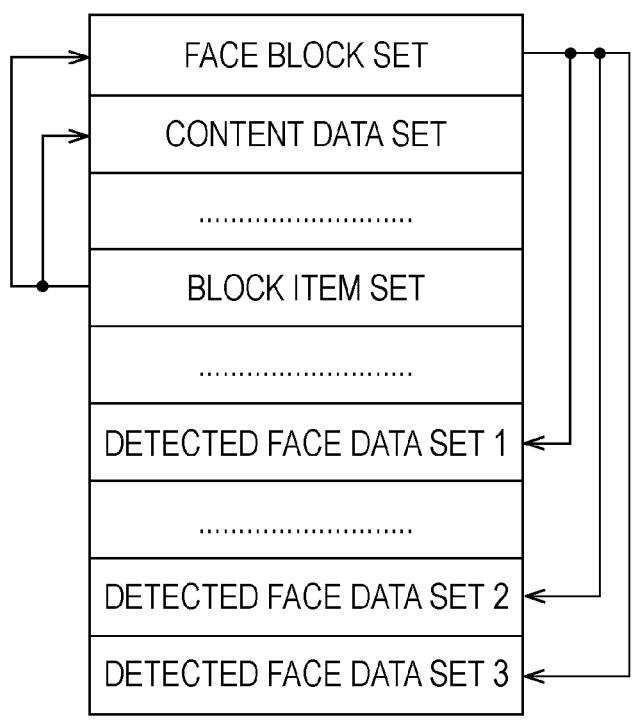
FIG. 13 is a diagram illustrating an example of a manner in which a block item set, a content data set, a face block set, and detected face data sets are stored in continuous storage areas of a storage medium.

In the case where the total data size of the face metadata 131 including the block item set, the content data set, the face block set, and the three detected face data sets 1 to 3 is greater than any physically continuous free storage area of the storage medium 35, then, as shown in FIG. 13, the face metadata 131 is stored in the storage medium 35 in units of data sets such that each of the block item set, the content data set, the face block set, and the detected face data sets 1 to 3 is stored in a physically continuous storage area of the storage medium 35.

For example, the face block set and the content data set are stored in a physically continuous storage area of the storage medium 35, the block item set is stored in another physically continuous storage area spaced apart from the storage area in which the face block set and the content data set are stored. The detected face data set 1 is stored, in the storage medium 35, in a physically continuous storage area spaced apart from the storage area in which the face block set and the content data set are stored and apart from the storage area in which the block item set is stored. The detected face data set 2 and the detected face data set 3 are stored, in the storage medium 35, in a physically continuous storage area spaced apart from any of the storage area in which the face block set and the content data set are stored, the storage area in which in which the block item set is stored, and the storage area in which the detected face data set 1 is stored.

Also in this case, the block item set points to the storage locations of the content data set and the face block set, and the face block set points to the storage locations of the detected face data sets 1 to 3.

As described above, even in the case where the number of detected face images varies from one content to another, and thus the number of metadata to be stored for respective detected face images varies, the face metadata 131 is stored in the storage medium 35 in units of data sets and thus, even when the whole face metadata 131 is not stored in a storage area of the storage medium 35, the face metadata 131 is stored in units of data sets in smaller storage areas of the storage medium 35 in a very efficient manner.

As described above with reference to FIG. 2, when a given content is a still image, the face metadata 131 may be stored in a content file 125 provided for use to store content data as with APP1 in an EXIF IDF file in the EXIF format, or, in a case where a content management file for managing contents is available separately from the content file 125, the face metadata 131 may be stored in the content management file.

Alternatively, the face metadata 131 may be stored in both the content file 125 and the content management file.

The process of reading face metadata 131 stored in the storage medium 35 is described below.

In the following explanation, by way of example, it is assumed that face location information in the detected face data set is read.

First, the block item set reader 151 of the playback controller 124 reads the block item set in the face metadata 131 from the storage medium 35 and then reads the metadata version information from the block item set to determine whether it is possible to read specified data included in the face metadata 131.

For example, when it is requested to read face metadata 131 added as a new version, if the version number stored in the playback controller 124 is lower than the new version number of the face metadata 131 requested to be read, then the playback controller 124 terminates the reading of the face metadata 131 and, if necessary, notifies a user that the face metadata 131 of the specified version is not stored.

This makes it possible to determine whether it is possible to perform the specified process without having to perform searching over the entire face metadata 131.

Next, the block item set reader 151 searches for the content data storage location information from the block item set on the basis of the tag number. If the block item set reader 151 detects the content data storage location information, the block item set reader 151 detects address information described in the content data storage location information thereby to detect the storage location of the content data set and also detects the data size of the content data set. The content data set reader 152 then reads the content data set from the storage medium 35 in accordance with the address of the content data set and the data size thereof. The content data set reader 152 then reads various metadata from the content data set as required.

For example, the content data set reader 152 reads the image content update date/time, and the playback controller 124 compares the read image content update date/time with the update date/time information of the content described in a storage area not shown in the figure. In a case where the playback controller 124 determines that the read image content update date/time is different from the update date/time information of the content described in the storage area not shown in the figure, the playback controller 124 stops the following process and, if necessary, notifies a user that the face metadata 131 is not consistent with the content. In this case, the playback controller 124 may display a screen on the LCD 39 to prompt the user to determine whether to re-detect a face image.

Next, by searching for the face block storage location information from the block item set on the basis of the tag number, the block item set reader 151 reads, from face block storage location information, the address at which the face block set is stored and the data size of the face block set.

The face block set reader 153 reads the face block set from the storage medium 35 in accordance with the address of the face block set and the data size of the face block set, and the face block set reader 153 then reads each piece of detected face data storage location information of the face block set.

In accordance with the detected face data storage location information, the detected face data set reader 154 reads a necessary detected face data set from the storage medium 35. The detected face data set reader 154 then reads the face location information included in the detected face data set.

Next, the detected face data set reader 154 reads another detected face data set from the storage medium 35 according to corresponding another piece of detected face data storage location information described in the face block set, and reads the face location information described in this detected face data set.

As described above, when a plurality of metadata are put in a single tag, it is not needed to read metadata other than metadata to be read. This makes it possible to reduce a time needed to read metadata.

When it is desirable to also display personal information such as a person's name, the detected face data set reader 154 also reads the detected face ID described in the detected face data set in which each piece of face location information is described, and the person-of-detected-face data set reader 158 reads, from the person-of-detected-face data set, the personal information described in the person-of-detected-face data set which includes the person-of-detected-face ID having the same ID value as the above detected face ID.

That is, in this case, the block item set reader 151 reads the personal data block storage location information by searching for the personal data block storage location information from the block item set on the basis of the tag number, and reads, from the acquired personal data block storage location information, the address indicating the storage location of the personal data block set and the data size of the personal data block set.

The personal data block set reader 157 then reads the personal data block set from the storage medium 35 in accordance with the address and the data size of the personal data block set, and reads each piece of person-of-detected-face data storage location information described in the personal data block set.

Next, the person-of-detected-face data set reader 158 reads a necessary person-of-detected-face data set from the storage medium 35 in accordance with the predetermined person-of-detected-face data storage location information.

In the process of reading the detected face image data set, the block item set reader 151 searches for the image data block storage location information from the block item set on the basis of the tag number to detect the image data block storage location information and further detects therefrom the address indicating the storage location of the image data block set and the data size of the image data block set.

The image data block set reader 155 reads the image data block set from the storage medium 35 in accordance with the address of the image data block set and the data size of the image data block set, and further reads the detected face image data storage location information described in the image data block set.

Next, the detected face image data set reader 156 reads a necessary detected face image data set from the storage medium 35 in accordance with the predetermined detected face image data storage location information.

As described above, by searching for all pieces of face location information and clipping face images from a content in accordance with the face location information and personal information, it is possible to display face images of, for example, Mr. A, Mr. K, and Mr. O and names thereof as in the example shown in FIG. 14. Furthermore, a message such as "File 060111.jpg includes images of three persons." may be displayed. The number of persons described in the message, i.e., three persons in this specific example, can be obtained from the number-of-personal-data information described in the block item set. Similarly, various kinds of information may also be displayed on the basis of values obtained from the number-of-faces information or the number-of-face-images information described in the block item set.

Conversely, by inputting personal information, it is possible to search for contents including a person identified by the input personal information, and it is possible to display a list of faces.

As an example of a process on a motion image content, it is possible to display periods during which persons such as Mr. A, Mr. K, and Mr. O appear in the motion image content, in the form of bars together with face images and names as shown in FIG. 15.

In this state, it may be arranged so that if one of displayed face images is selected, the content may be played back starting from the time at which the person corresponding to the selected face image appears in the content.

As described above, in the playback of the face metadata 131, it is possible to quickly search for necessary face metadata. It is also possible to store and read face metadata 131 including a large number of various kinds of data or data with a large data size.

As described above, if metadata is stored in a storage medium, it is possible to read the metadata in a playback operation. In a case where data includes first metadata added for each content, first storage location information indicating a location at which the first metadata is stored in a storage medium, second metadata associated with each face image and added for each face image detected from a content, and second storage location information indicating a location at which the second metadata is stored in the storage medium, and the data is configured such that the first storage location information and third storage location information indicating a location at which the second storage location information is stored in the storage medium are described in a single data set, it is possible, in a playback operation, to more quickly read a necessary metadata of metadata including metadata associated with faces.

In a case where metadata is attached to a content, the metadata can be read from the content. Furthermore, in a case where data stored in a storage medium includes first metadata added for each content, first storage location information indicating a location at which the first metadata is stored in a storage medium, second metadata associated with each face image and added for each face image detected from a content, and second storage location information indicating a location at which the second metadata is stored in the storage medium, and the first storage location information and third storage location information indicating a location at which the second storage location information is stored in the storage medium form one data set, it is possible to further quickly read a necessary metadata of metadata including metadata associated with faces.

The present invention may be applied not only to the digital camera 11 capable of taking motion images or still images, but also to other various devices capable of taking an image of a subject such as a portable telephone or content recording/playback devices such as a DVD (Digital Versatile Disc) recorder/player or a hard disk recorder/player.

The sequence of processing steps described above may be performed by means of hardware or software. When the processing sequence is executed by software, a program forming the software may be installed from a program storage medium onto a computer which is provided as dedicated hardware or may be installed onto a general-purpose computer capable of performing various processes in accordance with various programs installed thereon.

Figure 16:
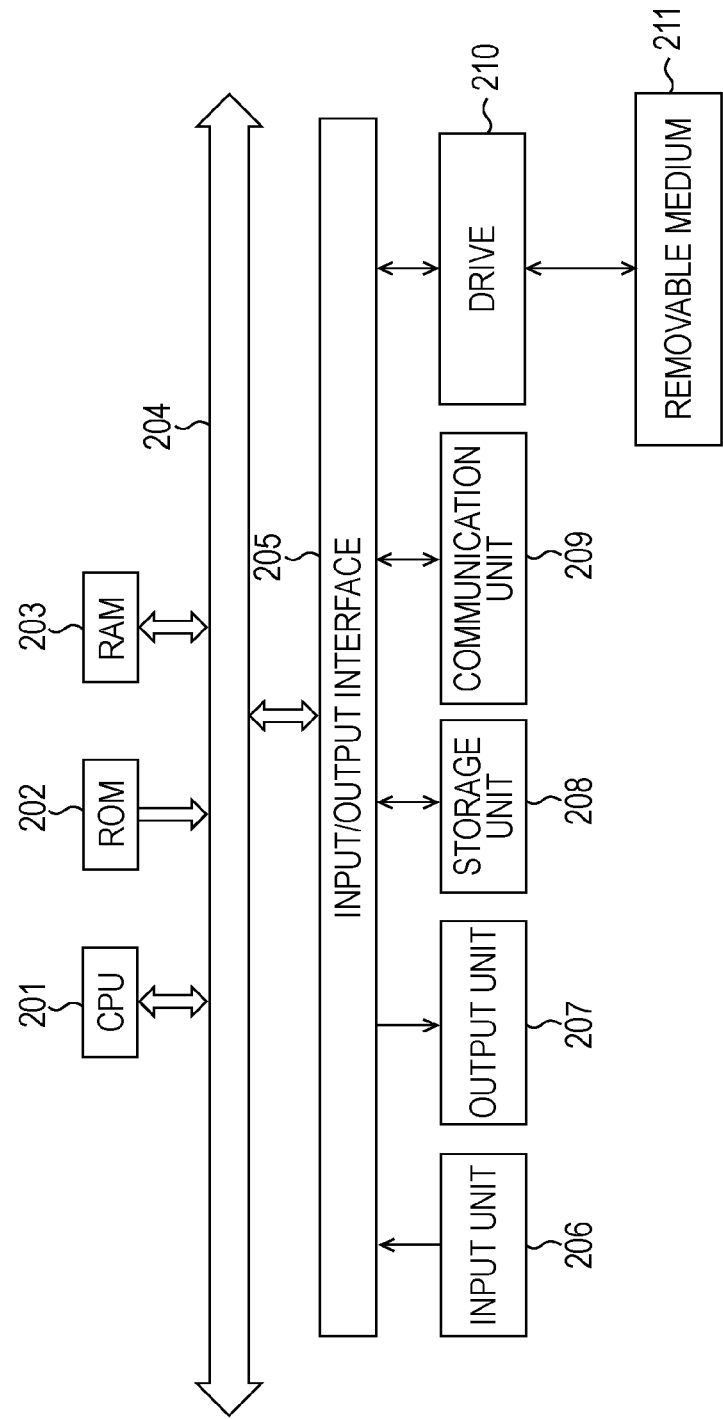
FIG. 16 is a block diagram illustrating an example of a configuration of a personal computer.

FIG. 16 is a block diagram illustrating an example of a personal computer configured to execute a program to perform the sequence of processing steps described above. A CPU (Central Processing Unit) 201 performs various processes in accordance with a program stored in a ROM (Read Only Memory) 202 or a storage unit 208. A RAM (Random Access Memory) 203 stores the program executed by the CPU 201 and also stores data. The CPU 201, the ROM 202, and the RAM 203 are connected to each other via a bus 204.

An input/output interface 205 is connected to the CPU 201 via the bus 204. The input/output interface 205 is also connected to an input unit 206 including a keyboard, a mouse, a microphone and the like and an output unit 207 including a display and a speaker. The CPU 201 performs various processes in accordance with commands input via the input unit 206 and outputs results of the processes to the output unit 207.

The storage unit 208 connected to the input/output interface 205 is realized, for example, by a hard disk and is adapted to store programs and data executed or used by the CPU 201. A communication unit 209 is adapted to communicate with an external apparatus via a network such as the Internet or a local area network.

A program may be acquired via the communication unit 209 and may be stored in the storage unit 208.

When a removable medium 211 such as a magnetic disk, an optical disk, a magneto-optical disk or a semiconductor memory is mounted on a drive 210 connected to the input/output interface 205, the drive 210 drives the mounted removable medium 211 and acquires a program or data stored thereon. The acquired program or data is transferred, as required, to the storage unit 208 and stored therein.

The storage medium in which a computer program to be installed in a computer-executable form is stored may be implemented, as shown in FIG. 16, using a removable medium 211 which is a package medium such as a magnetic disk (such as a floppy disk), an optical disk (such as a CD-ROM (Compact Disk-Read Only Memory) and a DVD (Digital Versatile Disk)), a magneto-optical disk, or a semiconductor memory, or using a ROM 202 in which the program is temporarily or permanently stored or using a hard disk of the storage unit 208. The program may be stored in the program storage medium via a wire communication medium such as a local area network or the Internet or via a wireless communication medium such as digital broadcasting, using the communication unit 209 serving as an interface such as a router or a modem.

In the present description, the steps described in the program stored in the storage medium may be performed either in time sequence in accordance with the order described in the program or in a parallel or separate fashion.

Note that the present invention is not limited to the details of the embodiments described above, but various modifications are possible without departing from the scope of the present invention.

The invention claimed is:
1. A storage apparatus comprising:
a storage controller configured to control data stored in a storage medium such that the data includes (i) first metadata added for each content, (ii) first storage location information indicating a location at which the first metadata is stored in the storage medium, (iii) second metadata associated with each face image and added for each face image detected from the content, and (iv) second storage location information indicating a location at which the second metadata is stored in the storage medium, wherein the second metadata further includes a locally defined identifier that associates a single personal data block set in the first metadata to two or more face images corresponding to face image data of the same person; and
wherein the data is configured by the storage controller such that (i) the first storage location information, and (ii) a third storage location information indicating a location at which the second storage location information is stored in the storage medium, are described in a single data set among a plurality of data sets.
2. The storage apparatus according to claim 1, wherein the data is configured such that the first metadata includes information indicating a version of face detection means which has detected the face image from the content.

3. The storage apparatus according to claim 1, wherein the data is configured such that the second metadata includes information indicating a location of the face image in the content and information indicating a size of the face image.

4. The storage apparatus according to claim 1, wherein the storage controller is configured to control storing the data in the storage medium such that a set of the first metadata, a set of the first storage location information, a set of each second metadata, and a set of a plurality of pieces of second storage location information are stored in the storage medium such that each set is stored in a continuous storage area of the storage medium.

5. The storage apparatus according to claim 1, wherein the data being configured such that a set of the first storage location information includes information indicating a number of face images for each of which second metadata is added.

6. The storage apparatus according to claim 5, wherein the data being configured such that the set of first storage location information includes information indicating a number of face images which are selected, in accordance with a predetermined rule, from face images detected from the content and for each of which second metadata is added.

7. The storage apparatus according to claim 1, wherein:
the data further includes face image data of each face image detected from the content and fourth storage location information indicating a location at which each face image data is stored in the storage medium, and
the data is configured such that the set of first storage location information includes fifth storage location information indicating a location at which the fourth storage location information is stored in the storage medium.

8. The storage apparatus according to claim 7, wherein the storage controller is configured to control storing the data in the storage medium such that a set of a plurality of pieces of fourth storage location information is stored in a continuous storage area of the storage medium.

9. The storage apparatus according to claim 7, wherein the data is configured such that the set of first storage location information includes information indicating a number of face image data.

10. The storage apparatus according to claim 1, wherein:
the data further includes third metadata associated with a person whose face image has been detected from the content, and fourth storage location information indicating a location at which the third metadata is stored in the storage medium, and the data is configured such that the set of first storage location information includes fifth storage location information indicating a location at which the fourth storage location information is stored in the storage medium.

11. The storage apparatus according to claim 10, wherein the storage controller is configured to control storing the data in the storage medium such that a set of a plurality of pieces of fourth storage location information is stored in a continuous storage area of the storage medium.

12. The storage apparatus according to claim 10, wherein the data is configured such that the set of first storage location information includes information indicating a number of third metadata.

13. A storage method including the step of controlling storing data in a storage medium, the data including (i) first metadata added for each content, (ii) first storage location information indicating a location at which the first metadata is stored in the storage medium, (iii) second metadata associated with each face image and added for each face image detected from the content, and (iv) second storage location information indicating a location at which the second metadata is stored in the storage medium, wherein the second metadata further includes a locally defined identifier that associates a single personal data block set in the first metadata to two or more face images corresponding to face image data of the same person; and
wherein the data is configured such that (i) the first storage location information and (ii) a third storage location information indicating a location at which the second storage location information is stored in the storage medium, are described in a single data set.

14. A non-transitory computer-readable storage medium comprising instructions that when executed by at least one processor, perform the storage method including the step of controlling storing data in a storage medium, the data including (i) first metadata added for each content, (ii) first storage location information indicating a location at which the first metadata is stored in the storage medium, and (iii) second metadata associated with each face image and added for each face image detected from the content, wherein the second metadata further includes a locally defined identifier that associates a single personal data block set in the first metadata to two or more face images corresponding to face image data of the same person; and
wherein the second storage location information indicates a location at which the second metadata is stored in the storage medium, and the data is configured such that (i) the first storage location information and (ii) a third storage location information indicating a location at which the second storage location information is stored in the storage medium, are described in a single data set among a plurality of data sets.

15. A playback apparatus having a read controller configured to control reading data stored in a storage medium, the data including (i) first metadata added for each content, (ii) first storage location information indicating a location at which the first metadata is stored in the storage medium, (iii) second metadata associated with each face image and added for each face image detected from the content, and (iv) second storage location information indicating a location at which the second metadata is stored in the storage medium, wherein the second metadata further includes a locally defined identifier that associates a single personal data block set in the first metadata to two or more face images corresponding to face image data of the same person; and
wherein the data is configured such that (i) the first storage location information and (ii) a third storage location information indicating a location at which the second storage location information is stored in the storage medium, are described in a single data set among a plurality of data sets, the single data set stored along a physically continuous storage area of the storage medium.

16. The playback apparatus according to claim 15, wherein the data is stored in the storage medium such that a set of the first metadata, a set of the first storage location information, a set of each second metadata, and a set of a plurality of pieces of second storage location information are stored such that each set is stored in a continuous storage area of the storage medium.

17. The playback apparatus according to claim 15, wherein the data is configured such that a set of the first storage location information includes information indicating a number of face images for each of which second metadata is added.

18. The playback apparatus according to claim 15, wherein the data further includes face image data of each face image detected from the content and fourth storage location information indicating a location at which each face image data is stored in the storage medium, the data being configured such that the set of first storage location information includes fifth storage location information indicating a location at which the fourth storage location information is stored in the storage medium.

19. The playback apparatus according to claim 18, wherein the data is stored such that a set of a plurality of pieces of fourth storage location information is stored in a continuous storage area of the storage medium.

20. The playback apparatus according to claim 18, wherein the data is configured such that the set of first storage location information includes information indicating a number of face image data.

21. The playback apparatus according to claim 15, wherein the data further includes third metadata associated with a person whose face image has been detected from the content, and fourth storage location information indicating a location at which the third metadata is stored, the data being configured such that the set of first storage location information includes fifth storage location information indicating a location at which the fourth storage location information is stored in the storage medium.

22. The playback apparatus according to claim 21, wherein the data is stored such that a set of a plurality of pieces of fourth storage location information is stored in a continuous storage area of the storage medium.

23. The playback apparatus according to claim 21, wherein the data is configured such that the set of first storage location information includes information indicating a number of third metadata.

24. A playback method including the step of controlling reading data stored in a storage medium, the data including (i) first metadata added for each content, (ii) first storage location information indicating a location at which the first metadata is stored in the storage medium, (iii) second metadata associated with each face image and added for each face image detected from the content, and (iv) second storage location information indicating a location at which the second metadata is stored in the storage medium, wherein the second metadata further includes a locally defined identifier that associates a single personal data block set in the first metadata to two or more face images corresponding to face image data of the same person; and wherein the data is configured such that (i) the first storage location information and (ii) a third storage location information indicating a location at which the second storage location information is stored in the storage medium, are described in a single data set among a plurality of data sets.

25. A non-transitory computer-readable storage medium comprising instructions that when executed by at least one processor, perform the playback method including the step of controlling reading data stored in a storage medium, the data including (i) first metadata added for each content, (ii) first storage location information indicating a location at which the first metadata is stored in the storage medium, (iii) second metadata associated with each face image and added for each face image detected from the content, and second storage location information indicating a location at which the second metadata is stored in the storage medium, wherein the second metadata further includes a locally defined identifier that associates a single personal data block set in the first metadata to two or more face images corresponding to face image data of the same person; and wherein the data is configured such that (i) the first storage location information and (ii) a third storage location information indicating a location at which the second storage location information is stored in the storage medium, are described in a single data set among a plurality of data sets.

* * * * *